(12) United States Patent
Narita et al.

(10) Patent No.: US 6,470,738 B2
(45) Date of Patent: Oct. 29, 2002

(54) ROTATING PROBE MICROSCOPE

(75) Inventors: Yoshihito Narita, Tokyo (JP); Hideho Hisada, Tokyo (JP); Tatsuya Miyajima, Tokyo (JP); Osamu Saito, Tokyo (JP); Shinichiro Watanabe, Tokyo (JP); Shinya Saito, Tokyo (JP); Koji Akutsu, Tokyo (JP); Susumu Teruyama, Tokyo (JP); Motoichi Ohtsu, Kanagawa (JP)

(73) Assignees: Jasco Corporation, Tokyo (JP); Technology Corporation, Saitama (JP); Kanagawa Academy of Science & Technology, Kanagawa (JP)

( * ) Notice: Subject to any disclaimer, the term of this patent is extended or adjusted under 35 U.S.C. 154(b) by 0 days.

(21) Appl. No.: 09/573,636

(22) Filed: May 17, 2000

(65) Prior Publication Data

US 2001/0017054 A1 Aug. 30, 2001

(30) Foreign Application Priority Data

May 24, 1999 (JP) .............................. 11-143519

(51) Int. Cl.$^7$ .............................. G02B 21/00; G01L 5/00
(52) U.S. Cl. ........................ 73/105; 250/306; 250/234; 250/236
(58) Field of Search ............................ 73/105; 250/306, 250/307, 234, 236, 201.3

(56) References Cited

U.S. PATENT DOCUMENTS

| | | | | |
|---|---|---|---|---|
| 4,851,671 A | * | 7/1989 | Pohl ............................ 250/306 |
| 5,245,863 A | * | 9/1993 | Kajimura et al. .............. 73/105 |
| 5,254,854 A | * | 10/1993 | Betzig ........................ 250/234 |
| 5,641,896 A | * | 6/1997 | Karrai ......................... 73/105 |
| 5,805,541 A | * | 9/1998 | Takeda et al. ............... 250/306 |
| 6,043,485 A | * | 3/2000 | Naya ........................... 250/234 |
| 6,169,281 B1 | * | 1/2001 | Chen et al. .................... 73/105 |
| 6,223,591 B1 | * | 3/2001 | Nakano ........................ 73/105 |

FOREIGN PATENT DOCUMENTS

| EP | 0247219 A1 | * 12/1987 |
|---|---|---|
| EP | 0 791 802 A2 | 8/1997 |
| EP | 0 871 166 A1 | 10/1998 |

OTHER PUBLICATIONS

Japanese Patent Office, *Patent Abstracts of Japan*, Publication No. 11044693, Publication Date: Feb. 16, 1999, Application No. 09199708, Application Date: Jul. 25, 1997. vol. 1999, No. 5, May 31, 1999.

* cited by examiner

*Primary Examiner*—Hezron Williams
*Assistant Examiner*—Michael Cygan
(74) *Attorney, Agent, or Firm*—Snider & Associates; Ronald R. Snider

(57) ABSTRACT

In a probe microscope 120 for causing a sample 112 and a tip portion 118a of a probe 118 on the sample side to approach each other, detecting an interaction between the sample 112 and the sample-side probe tip portion 118a, and obtaining surface information of the sample 112 from the interaction, the probe 118 being a flexible needle-like probe; the probe microscope 120 comprises vibrating means 122 capable of rotating the probe 118 while flexing the sample-side tip portion 118a thereof so as to draw a circle having a size corresponding to an increase and decrease in the interaction between the sample surface 112 and the tip portion 118a, and detecting means 124 for detecting the increase and decrease in the size of the circle drawn by the sample-side probe tip portion 118a due to the interaction and obtaining, from the increase and decrease in the size of the circle, information about the distance between the sample 112 and the sample-side probe tip portion 118a.

12 Claims, 35 Drawing Sheets

ROTATING PROBE MICROSCOPE

This application claims the priority of Japanese Patent Application No. 11-143519 filed on May 24, 1999, which is incorporated herein by reference.

FIELD OF THE INVENTION

The present invention relates to a probe microscope; and, in particular, to a probe microscope capable of attaining highly reliable sample information.

BACKGROUND OF THE INVENTION

For example, for accurately grasping irregularities of a surface of a sample, a scanning tunneling microscope (STM) is used.

According to the principle of measurement in the STM, a probe made of a metal is caused to approach an electrically conductive sample to a distance of about 1 nm, and a minute voltage is applied therebetween, whereby a current flows. This current is known as tunneling current, and is sensitive to changes in the distance therebetween, such that it alters by substantially one digit at most with respect to a change of 0.1 nm.

Therefore, if the metal-made probe is attached to a precision actuator capable of three-dimensional driving, and the measurement sample surface is scanned so as to keep the tunneling current constant, then the distance therebetween will be held constant, and the probe will trace the irregularities of the sample surface on the atomic order.

Here, if the change in the voltage applied to the precision actuator is visualized, then it will correspond to the form of the sample surface.

Insulating samples which could not be observed by the STM can be observed by an atomic force microscope (AFM) derived from the STM.

The AFM detects, instead of the tunneling current used in the STM, the atomic force (attractive force or repulsive force) acting between the measurement sample surface and the probe.

Here, as the probe of the AFM, a metal-made cantilever probe 10 such as the one shown in FIGS. 1A and 1B is employed.

FIG. 1A is a front view thereof, whereas FIG. 1B is a top plan view thereof

If the cantilever probe 10 is caused to approach the measurement sample surface 12 while being minutely vibrated up down (in the directions of $V_v$) in FIG. 1A, then an atomic force will act therebetween, thereby changing the amplitude of vibration of the probe 10.

Hence, probe light L1 from a probe irradiating portion 14 irradiates the probe 10, and the change in intensity of transmitted or reflected probe light L2 from the probe 10 is detected by a photodetector 16. From this change in intensity, information about the change in amplitude of vibration of the probe 10 is obtained.

If the distance therebetween is determined from the change in amplitude of vibration, and the stage mounting the measurement sample is driven to scan the measurement sample surface such that the change in amplitude of vibration is kept constant while the probe position is fixed, then the distance therebetween will be held constant, and the probe can accurately trace the irregularities of the measurement sample surface.

If the metal-made cantilever probe 10 is vibrated up and down (in the directions of $V_v$) in FIG. 1A, on the other hand, then ingredients of the sample at the probe position and the like cannot be analyzed while the irregularities of the measurement sample surface 12 can be grasped accurately.

Therefore, in recent years, near-field optical microscopes, having a spatial resolution smaller than the wavelength of light, capable of spectral analysis and measurement, have been developed with expectation for their applications.

The near-field optical microscopes include two systems, i.e., collection mode in which an optical near-field occurring in the measurement sample surface is scattered at a needle-like probe tip portion and collected so as to be detected, and illumination mode in which the measurement sample surface is illuminated with the near-field light occurring from the needle-like probe tip portion and the light scattered or released by the measurement sample surface is collected and detected by the probe or a light-collecting optical system.

In any case, the optical near field is generated in an area on the order of several tens of nanometers from the measurement sample surface, whereby the distance between the measurement sample surface and the fiber probe must be controlled within a very minute distance not longer than the wavelength of light.

For controlling the distance between the measurement sample surface and the probe, shear force feedback method is employed in general.

In the shear force feedback method, as shown in FIGS. 2A and 2B, a needle-like probe 18 is caused to approach the measurement sample surface 12 while being uniaxially vibrated (in the directions of $V_H$) on the measurement sample surface 12.

FIG. 2A is a front view thereof, whereas FIG. 2B is a top plan view thereof When the distance between the measurement sample surface 12 and the probe 18 falls within the reach of the optical near field, then a shear force acts therebetween, thereby changing the amplitude of vibration of the probe 18.

Hence, probe light L1 from the probe irradiating portion 14 irradiates the fiber probe 18, and the change in intensity of transmitted or reflected probe light L2 from the probe 10 is detected by the photodetector 16. From this change in intensity, information about the change in amplitude of vibration of the probe 18 is obtained.

If the distance therebetween is determined from the change in amplitude of vibration, and the stage mounting the measurement sample is driven to scan the measurement sample surface such that the change in amplitude of vibration of the needle-like probe 18 is kept constant while the probe position is fixed, then the distance therebetween will be held constant, and the needle-like probe 18 can accurately trace the irregularities of the measurement sample surface on the atomic order.

Thus, when the needle-like probe 18 is used for carrying out the illumination mode or collection mode, not only the irregularities of the measurement sample surface 12 can be grasped, but also ingredients of the sample at the probe position and the like can be analyzed.

However, such a needle-like probe 18 is also uniaxially vibrated on the measurement sample surface, and the lateral shift component of the atomic force acting between the measurement sample surface and the probe is detected, whereby its sensitivity would lower by one digit or more when compared with the case where the vertical component of the atomic force is measured with the cantilever probe 10.

If a shear force uniaxially vibrating the probe on the measurement sample surface is employed, then there may be a fear of a difference occurring in the obtained image of irregularities of measurement sample surface, depending on the scanning direction of the measurement sample surface, even in the same measurement sample surface.

Hence, the reliability of measurement results with the needle-like probe 18 has still a room for improvement, but no techniques for achieving it have been known yet.

SUMMARY OF THE INVENTION

In view of the above-mentioned background art, it is an object of the present invention to provide a probe microscope capable of attaining sample information with a higher reliability.

For achieving the above-mentioned object, the probe microscope in accordance with the present invention is a probe microscope for causing a measurement sample surface and a tip portion of a probe on the sample side to approach each other, detecting an interaction between the measurement sample surface and the tip portion of the probe on the sample side, and obtaining surface information of the measurement sample from the interaction; the probe microscope comprising vibrating means and detecting means.

Here, the probe is a flexible needle-like probe.

The vibrating means is capable of rotating the probe while flexing the tip portion thereof on the sample side so as to draw a circle having a size corresponding to an increase and decrease in the interaction between the measurement sample surface and the tip portion of the probe on the sample side.

The detecting means detects the increase and decrease in the size of the circle drawn by the tip portion of the probe on the sample side due to the interaction between the measurement sample surface and the tip portion of the probe on the sample side and obtains, from the increase and decrease in the size of the circle, information about the distance between the measurement sample surface and the tip portion of the probe on the sample side.

Here, the circle encompasses not only true circles but also ellipses and the like.

Preferably, in the present invention, while the vibrating means also vibrates the probe in a direction in which the measurement sample surface and the tip portion of the probe on the sample side approach each other or move away from each other, the detecting means detects the increase and decrease in the size of the circle drawn by the tip portion of the probe on the sample side due to the interaction between the measurement sample surface and the tip portion of the probe on the sample side and obtains, from the increase and decrease in the size of the circle, information about the distance between the measurement sample surface and the tip portion of the probe on the sample side.

Preferably, in the present invention, the vibrating means includes one driving member selected from the group consisting of a piezoelectric element and a motor which are capable of rotating the probe while flexing the tip portion thereof on the sample side such that at least the tip portion of the probe on the sample side draws a circle having a size corresponding to an increase and decrease in the interaction between the measurement sample surface and the tip portion of the probe on the sample side.

Preferably, in the present invention, the detecting means comprises a probe irradiating portion, a photodetector portion, and a signal processing portion.

Here, the probe irradiating portion is capable of irradiating the probe with probe light.

The photodetector portion detects reflected or transmitted probe light from the probe.

The signal processing portion obtains, from the reflected or transmitted probe light obtained by the photodetector portion, information about the increase and decrease in the size of the circle drawn by the tip portion of the probe on the sample side.

Preferably, in the present invention, the detecting means is one member selected from the group consisting of a quartz vibrator and a piezoelectric element which are capable of obtaining information about the increase and decrease in the size of the circle drawn by the tip portion of the probe on the sample side.

Preferably, the probe microscope in accordance with the present invention comprises a divided type piezoelectric element divided into four or more, for example, having a vibrating electrode pair placed face to face as the vibrating means and a detecting electrode pair placed face to face as the detecting means, which are arranged alternately over substantially the whole periphery on the opposite side of the probe from the tip portion on the sample side; and control means for causing the vibrating electrode pair to vibrate the probe and the detecting electrode pair to detect the increase and decrease in the size of the circle simultaneously or alternately in a time series.

Preferably, in the present invention, the interaction between the measurement sample surface and the tip portion of the probe on the sample side is a dynamic interaction such as an atomic force.

Preferably, in the present invention, the interaction between the measurement sample surface and the tip portion of the probe on the sample side is an optical near field.

Preferably, the probe microscope in accordance with the present invention further comprises scanning means and visualizing means.

Here, the scanning means is capable of scanning the measurement sample surface such that the distance between the measurement sample surface and the tip portion of the probe on the sample side obtained by the detecting means is kept constant.

The visualizing means visualizes control information of the scanning means, so as to visualize information about irregularities in the measurement sample surface.

Thus, the probe microscope in accordance with the present invention is configured such that the probe is a flexible needle-like probe such as a fiber probe, for example; the vibrating means rotates the probe while flexing the tip portion thereof on the sample side so as to draw a circle having a size corresponding to an increase and decrease in the interaction between the measurement sample surface and the tip portion of the probe on the sample side; and the detecting means detects the increase and decrease in the size of the circle drawn by the tip portion of the probe on the sample side due to the interaction between the measurement sample surface and the tip portion of the probe on the sample side and obtains, from the increase and decrease in the size of the circle, information about the distance between the measurement sample surface and the tip portion of the probe on the sample side.

As a result, in the present invention, the increase and decrease in the size of the circle drawn by the tip portion of the probe on the sample side due to the interaction between it and the measurement sample surface is detected, so as to detect the interaction of the longitudinal component, whereby the sensitivity of detection improves as compared with cases where typical lateral shift components such as shear force are detected.

Also, since the flexible needle-like probe such as fiber probe, for example, is employed, the present invention makes it possible to simultaneously analyze ingredients of the sample at the probe position and the like, which has been quite difficult with a typical metal-made cantilever probe.

Since the increase and decrease in the size of the circle drawn by the tip portion of the probe on the sample side due to the interaction between the probe and the measurement sample surface is detected, and information about the distance between the measurement sample surface and the probe is obtained from the increase and decrease in the size of the circle, there are no restrictions concerning the arrangement and number of detecting means and the like.

As a consequence, in the present invention, a freedom in arrangement of individual constituents of the detecting means, which has conventionally been quite hard to obtain, can be attained, and detection with a higher sensitivity can be carried out if the number of detecting means is increased, since the resulting amount of distance information such as the intensity of reflected or transmitted probe light will enhance thereby.

Since the increase and decrease in the size of the circle drawn by the tip portion of the probe on the sample side due to the interaction between the probe and the measurement sample surface is detected, the probe microscope of the present invention can carry out isotropic measurement, independent of the scanning direction of the measurement sample surface, which has been quite difficult in cases where typical lateral shift components such as shear force are detected or where a vertically vibrating cantilever probe is simply employed.

When the present invention uses one driving member selected from the group consisting of a piezoelectric element and a motor which are capable of rotating the probe while flexing the tip portion thereof on the sample side such that at least the tip portion of the probe on the sample side draws a circle having a size corresponding to an increase and decrease in the interaction between the measurement sample surface and the tip portion of the probe on the sample side, the probe can be vibrated favorably in a simple configuration.

When the present invention comprises a divided type piezoelectric element divided into four or more, for example, having a vibrating electrode pair placed face to face as the vibrating means and a detecting electrode pair placed face to face as the detecting means, which are arranged alternately over substantially the whole periphery on the opposite side of the probe from the tip portion on the sample side, and control means for causing the vibrating electrode pair to vibrate the probe and the detecting electrode pair to detect the increase and decrease in the size of the circle simultaneously or alternately in a time series, then space can be saved more as compared with the case where the vibrating means and the detecting means are provided independently from each other. As a consequence, the apparatus can be made smaller.

When scanning means scans the measurement sample such that the distance between the measurement sample surface and the tip portion of the probe on the sample side obtained by the detecting means is kept constant, and the visualizing means visualizes control information of the scanning means, so as to visualize information about irregularities in the measurement sample surface, then the information about irregularities in the measurement sample surface can be grasped accurately in the present invention.

DETAILED DESCRIPTION OF THE PREFERRED EMBODIMENT

In the following, preferred embodiments of the present invention will be explained.

Figure 1A:
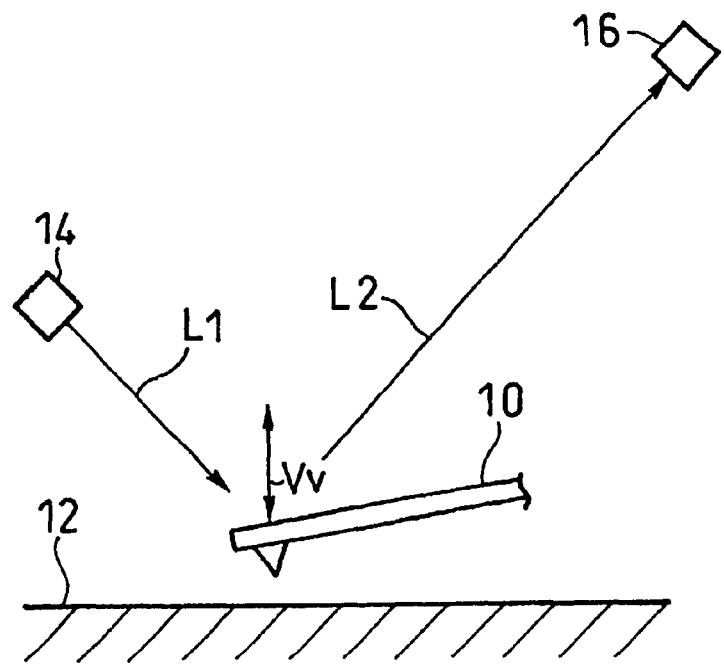
FIGS. 1A and 1B are explanatory views of the principle of measurement in a conventional atomic force microscope using a cantilever probe, which are a front view and a top plan view, respectively.
Figure 1B:
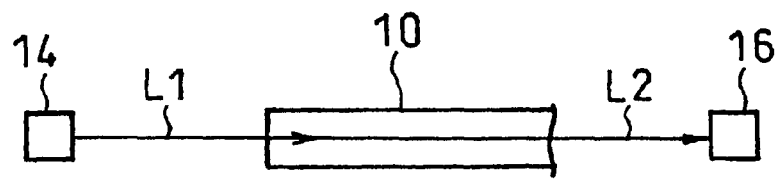
Figure 2A:
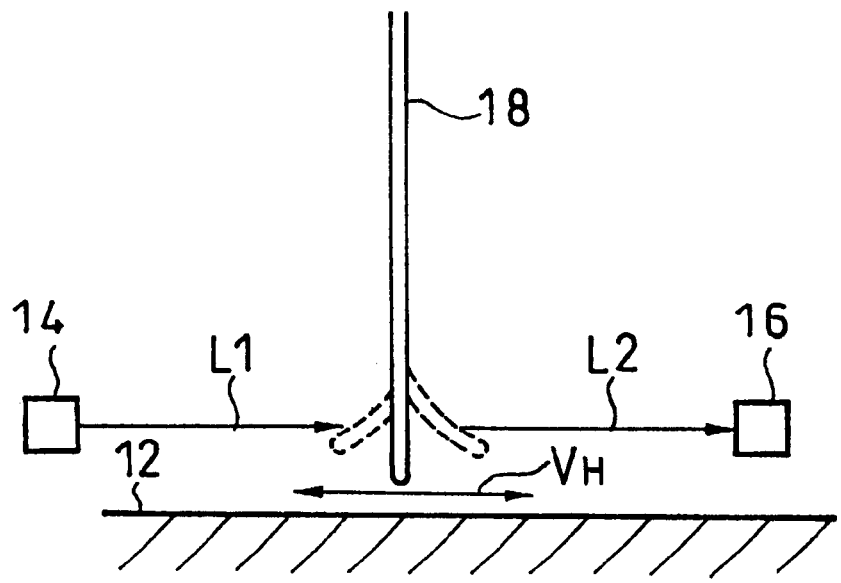
FIGS. 2A and 2B are explanatory views of the principle of measurement in a conventional probe microscope using a needle-like probe, which are a front view and a top plan view, respectively.
Figure 2B:
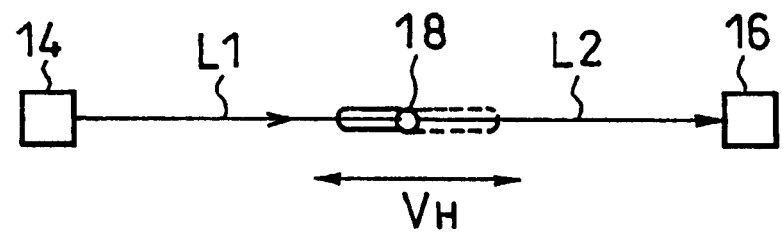
Figure 3:
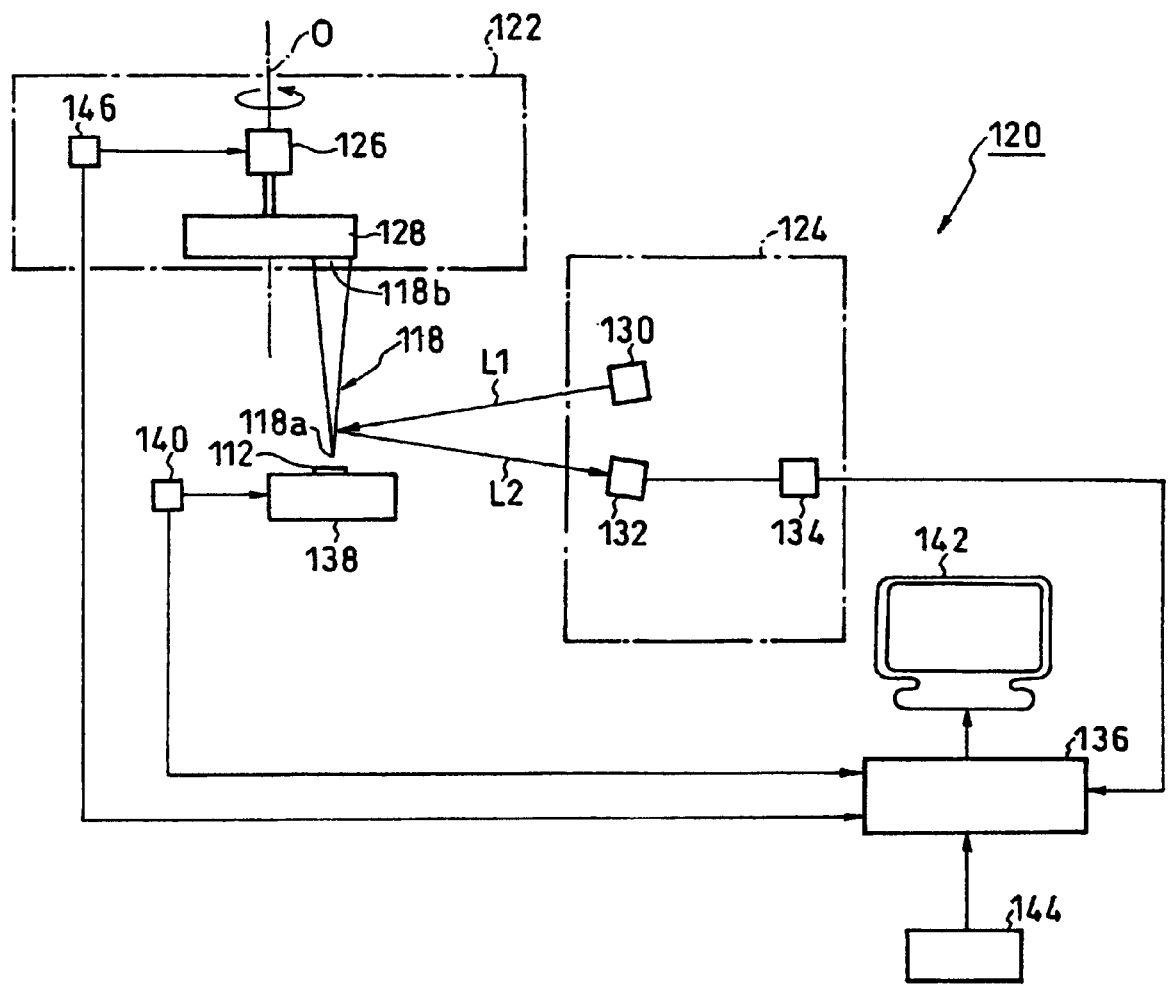
FIG. 3 is an explanatory view of a schematic configuration of an atomic force microscope in accordance with an embodiment of the present invention.

FIG. 3 shows a schematic configuration of an atomic force microscope in accordance with an embodiment of the present invention. Here, parts corresponding to those of the above-mentioned background art will be referred to with numerals in which 100 is added to those of the latter, without repeating their overlapping explanations.

The atomic force microscope 120 shown in this drawing includes a needle-like probe 118, vibrating means 122, and detecting means 124.

Here, as the needle-like probe 118, a flexible fiber probe can be employed, for example.

Also, the vibrating means 122 includes a motor 126 and a rotor 128. In the vibrating means 122, a tip portion 118b of the probe 118 on the side opposite from its sample-side tip portion 118a is attached to the lower face of the rotor 128 at a position deviated from the rotary axis O of the motor 126.

The vibrating means 122 rotates the probe 118 while flexing its sample-side tip portion 118a so as to draw a circle, such as true circle or ellipsis, having a size corresponding to an increase and decrease in an atomic force acting between a measurement sample surface 112 and the probe 118.

Further, the vibrating means 122 also vibrates the probe 118 in directions in which the measurement sample surface 112 and the probe 118 approach each other or move away from each other, i.e., upward and downward in the drawing. Namely, tapping is effected.

The detecting means includes, for example, a probe irradiating portion 130, a photodetector portion 132, and a signal processing portion 134.

The probe irradiating portion 130 comprises, for example, a laser diode (LD) or the like, and emits probe light L1 near the tip portion 118a of the probe 118.

The photodetector portion 132 detects reflected or transmitted probe light L2 from the probe 118.

From the reflected or transmitted probe light L2 obtained by the photodetector portion 132, the signal processing portion 134 obtains information about the increase and decrease in the size of a circle drawn by the sample-side probe tip portion 118a, such as its radius r. From the increase and decrease in the radius r, the distance between the measurement sample surface 112 and the probe 118 is determined. Thus determined distance is fed to a personal computer 136.

Namely, in this embodiment, the vibrating means 122 vibrates the probe 118 in directions in which the measurement sample surface 112 and the probe 118 approach each other or move away from each other, i.e., upward and downward in the drawing, and rotates the probe 118 while flexing its sample-side tip portion 118a so as to draw a circle, such as true circle or ellipsis, having a size corresponding to an increase and decrease in an atomic force acting between a measurement sample surface 112 and the probe 118.

Also, in this embodiment, the vibrating means 122 causes the measurement sample surface 112 and the probe 118 to approach each other, the detecting means 124 detects the increase and decrease in the radius of the circle drawn by the probe tip portion 118a due to the atomic force acting between it and the measurement sample surface 112, and information about the distance between the measurement sample surface 112 and the probe 118 is obtained from the increase and decrease in the radius.

For scanning the measurement sample surface, this embodiment includes an XYZ three-axis stage 138, stage moving means 140, and the personal computer 136 as stage control means.

Here, the stage moving means 140 can move the three-axis stage 138, on which the measurement sample 112 is mounted, in XYZ directions.

By way of the stage moving means 140, the personal computer 136 controls operations of the three-axis stage 138 such that the information about the distance between the measurement sample surface 112 and sample-side probe tip portion 118a from the detecting means 124 becomes constant.

While the three-axis stage 138 is driven so as to scan the measurement sample surface 112, the Z component of the voltage applied to the stage moving means 140, i.e., the vertical component in the drawing, and the like are visualized by the computer 136, whereby an image of irregularities of the measurement sample surface 112 is obtained. It is displayed on a monitor 142.

In this embodiment, various kinds of settings can be made by use of an input device 144 for the personal computer 136.

For example, a probe resonance frequency and the like can be set. By way of a driving circuit 146, the personal computer 136 controls operations of the vibrating means 122 with the probe resonance frequency from the input device 144.

The atomic force microscope in accordance with this embodiment is schematically configured as in the foregoing. Its operations will be explained in the following.

When the three-axis stage or the like causes the probe 118 and the measurement sample surface 112 to approach each other to a distance of about 1 nm, for example, then an atomic force (attractive force or repulsive force) acts therebetween.

This atomic force (attractive force or repulsive force) is detected by the detecting means, and the three-axis stage scans the sample surface such that thus detected force becomes constant.

To this aim, the measurement sample surface 112 is mounted on the three-axis stage 138, which can be driven in a three-dimensional manner, and the measurement sample surface 112 is scanned so as to keep the atomic force constant, whereby the distance between the measurement sample surface 112 and the probe 118 is held constant, so as to allow the probe 118 to trace the irregularities of the measurement sample surface 112 on the atomic order.

If the change in the vertical component of the voltage applied to the stage moving means 140 is visualized by the computer 136, then it will correspond to the form of the measurement sample surface 112.

Here, for controlling the distance between the measurement sample surface 112 and the probe 118, shear force feedback method by which the probe is vibrated in one axial direction of the measurement sample surface has been used in general.

When shear force is used, however, then the lateral shift component of the atomic force acting between the measurement sample surface and the probe is detected, whereby its sensitivity would lower by one digit or more when compared with the case where the vertical component of the atomic force is measured with the cantilever probe.

For example, depending on the scanning direction of the measurement sample surface 112, the resulting images of irregularities may vary even in the same measurement sample surface.

Hence, in this embodiment, the following technique is employed in place of the shear force.

Its operations will be explained with reference to FIGS. 4 to 6.

Figure 4:
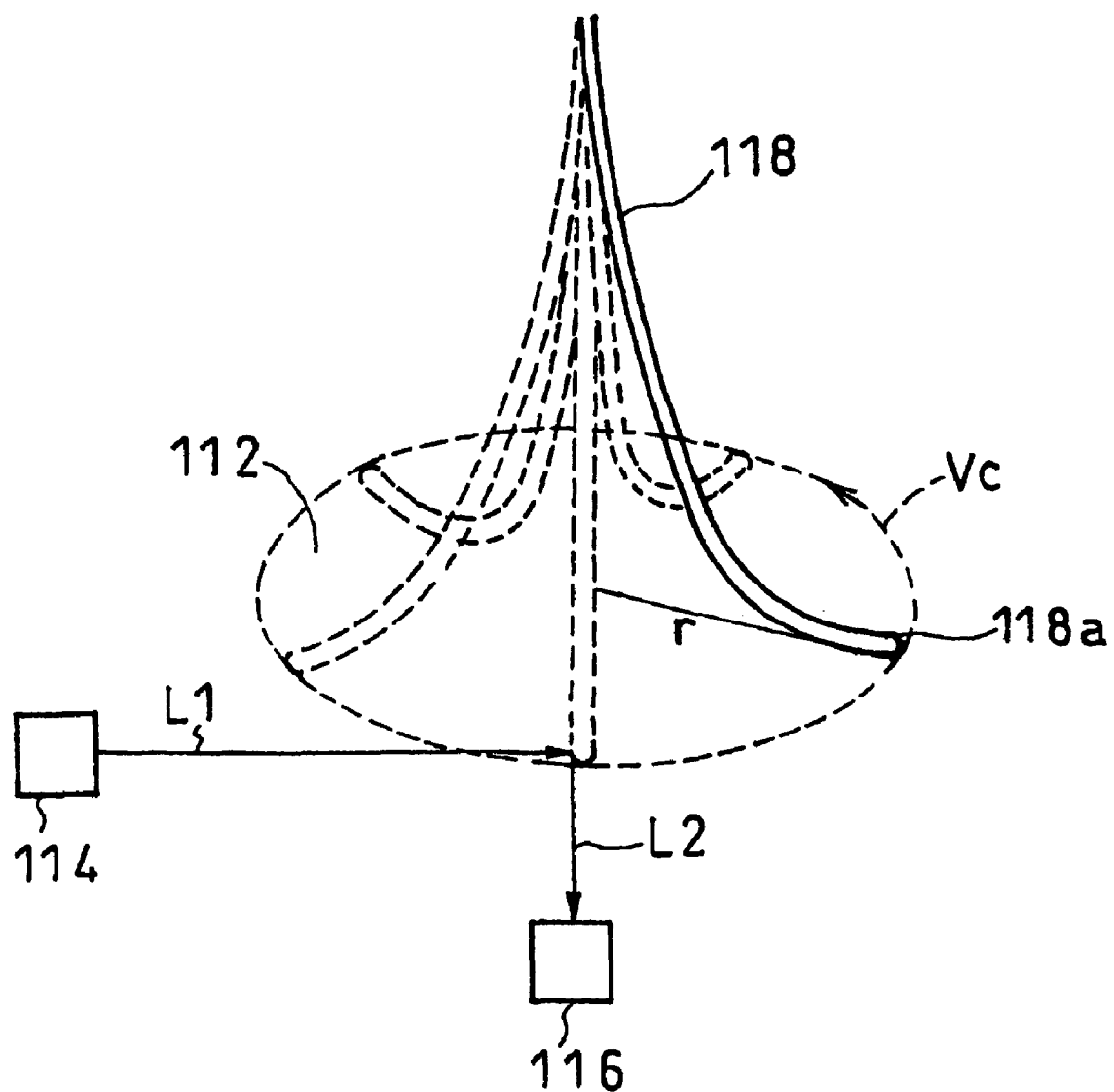
FIG. 4 is an explanatory view of the principle of measurement depicted as a perspective view, which is characteristic of the microscope shown in FIG. 3.
Figure 5A:
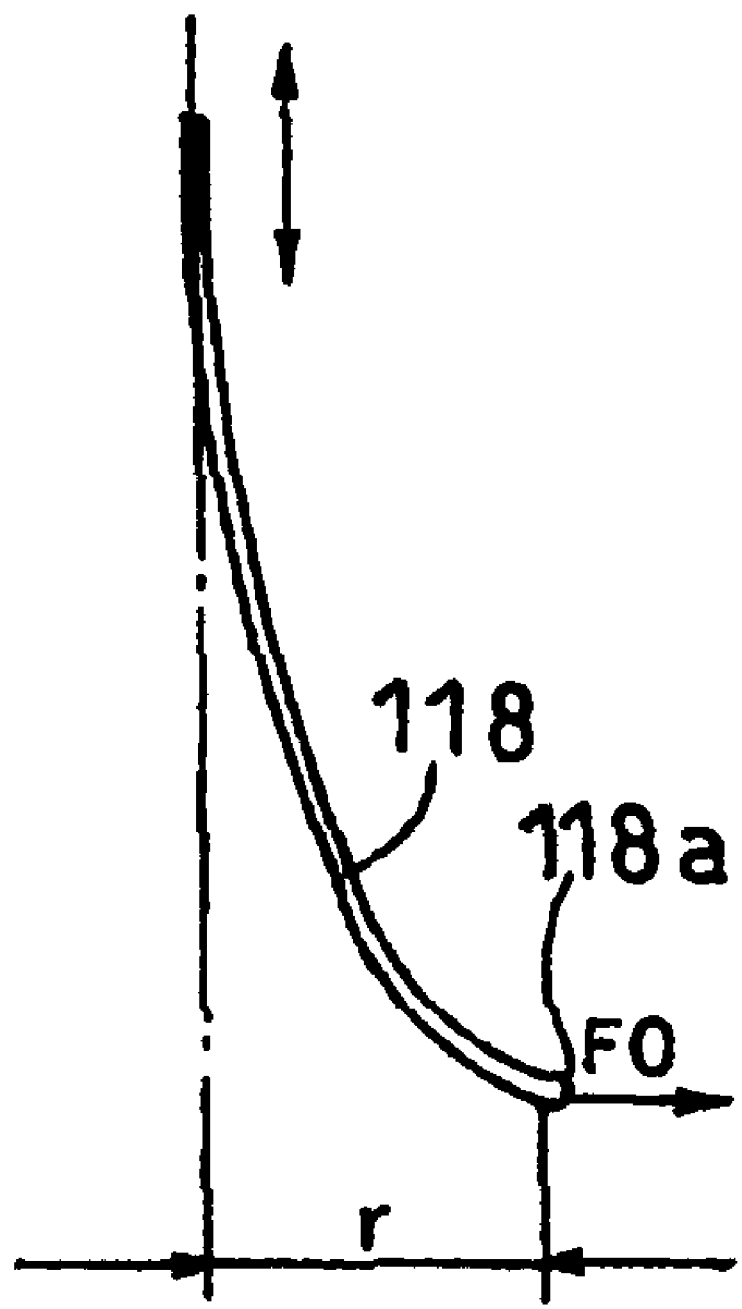
FIGS. 5A to 5C are explanatory views of the principle of measurement depicted as side views, which is characteristic of the microscope shown in FIG. 3.
Figure 5B:
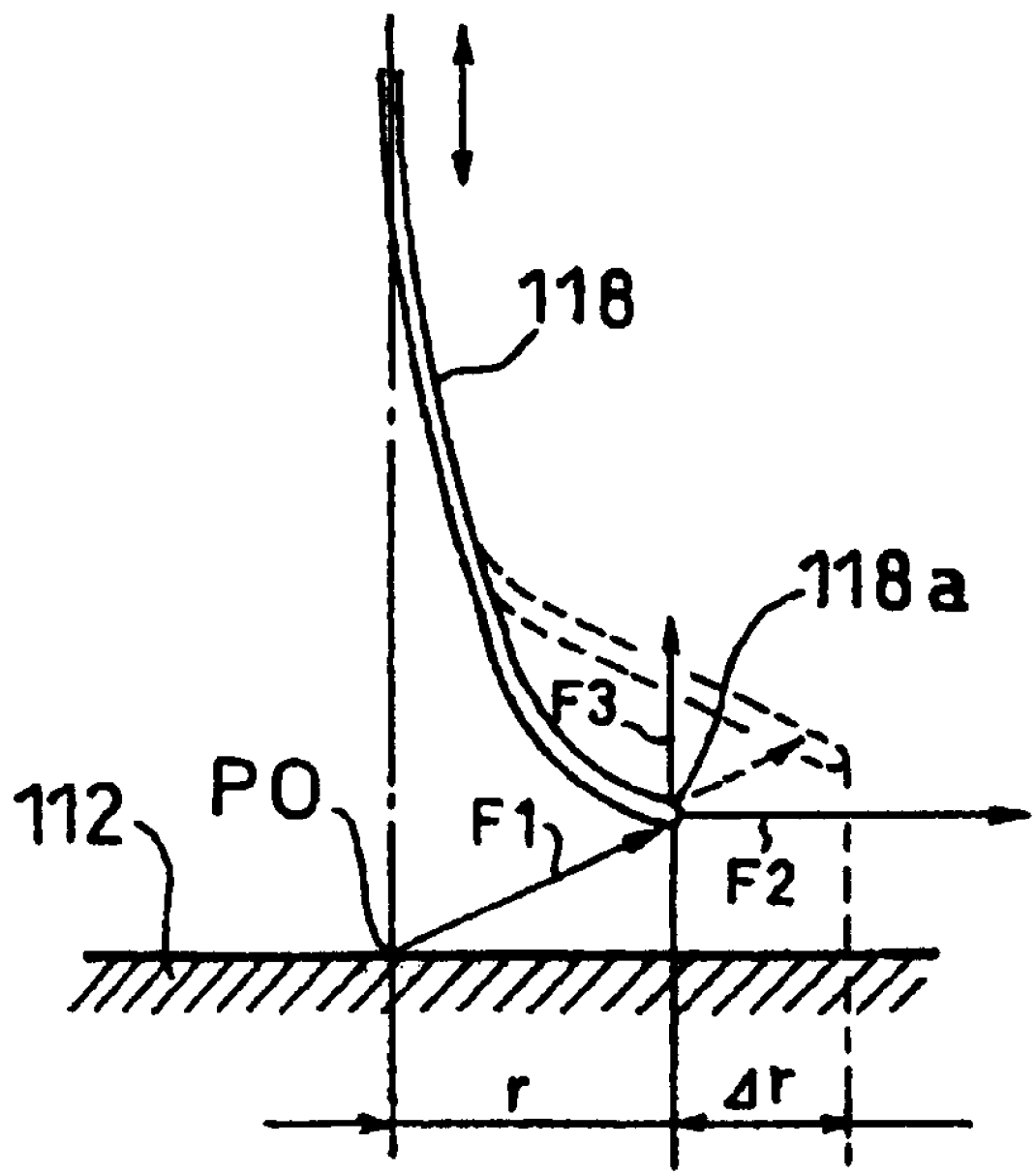
Figure 5C:
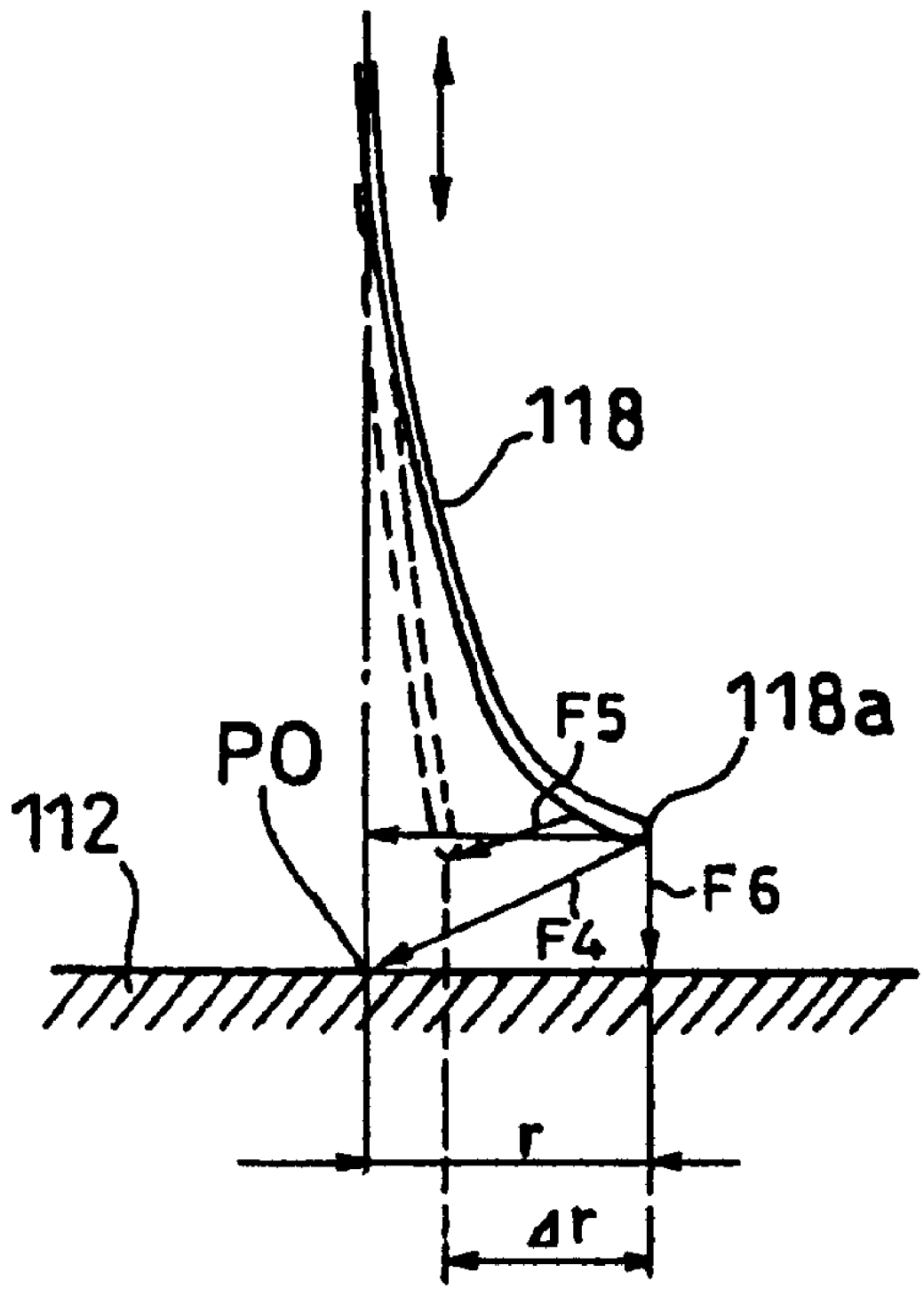
Figure 6:
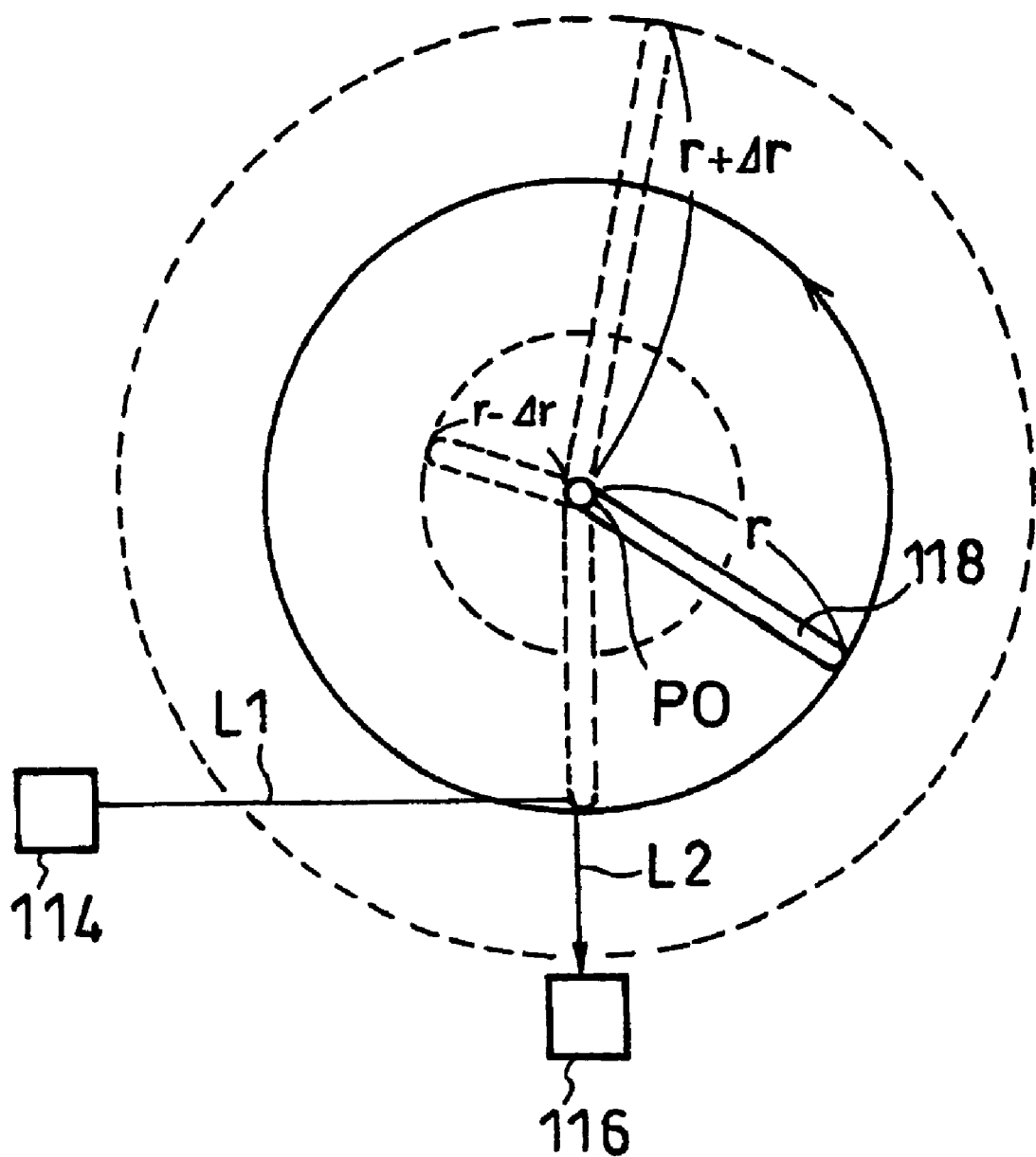
FIG. 6 is an explanatory view of the principle of measurement depicted as a top plan view, characteristic of the microscope shown in FIG. 3.

Here, FIG. 4 is a perspective view showing a state of rotation of the probe 118, FIGS. 5A to 5C are side views thereof, and FIG. 6 is a top plan view thereof Namely, in the microscope 120 in accordance with this embodiment, as shown in FIG. 4, the probe 118 can be rotated while flexing its sample-side tip portion 118a such that the sample-side tip portion 118a draws a circle having a radius r corresponding to the increase and decrease in the atomic force acting between the measurement sample surface 112 and the sample-side probe tip portion 118a.

Also, as shown in FIG. 5A, from the state where the measurement sample surface (not depicted) and the probe 118 are sufficiently separated from each other, i.e., from such a state that no atomic force acts therebetween, the measurement sample surface and the sample-side probe tip portion 118a are caused to approach each other while the probe 118 is also vibrated upward and downward in the drawing.

Namely, the stage is driven to move upward in the drawing, so that the measurement sample surface and the probe 118 approach each other.

Here, the measurement sample and the probe 118 are sufficiently separated from each other, and no atomic force acts therebetween, whereby the probe tip portion 118a is under the influence of a centrifugal force F0 alone, thereby drawing a circle having the radius r.

As the measurement sample surface 112 and the probe 118 approach each other, an atomic force acts therebetween. According to the increase and decrease in the atomic force, the radius r of the circle drawn by the sample-side probe tip portion 118a varies.

For example, as shown in FIG. 5B, when an atomic force (repulsive force F1) from a measurement point P0 acts on the sample-side probe tip portion 118a, then a force component F2 and a force component F3 act on the tip portion 118a, so that the tip portion 118a is pulled outward in the drawing, whereby the circle of rotation increases its radius by an amount Δr corresponding to the atomic force (repulsive force F1).

Namely, the radius of rotation in this case becomes r+Δr, where r is the radius of rotation when no atomic force acts thereon.

On the other hand, as shown in FIG. 5C, when an atomic force (attractive force F4) from the measurement point P0 acts on the probe tip portion 118a in the drawing, then a force component F5 and a force component F6 act on the tip portion 118a, so that the tip portion 118a is pulled inward, whereby the circle of rotation decreases its radius by an amount Δr corresponding to the atomic force (attractive force F4).

Namely, the radius of rotation in this case becomes r−Δr, where r is the radius of rotation when no atomic force acts thereon.

Thus, as shown in FIGS. 5A to 5C, the vertical component of atomic force, i.e., the change in atomic force in the vertical direction in the drawing, is detected as the increase and decrease in the rotation radius r in this embodiment.

Such an increase and decrease in the rotation radius r is detected, for example, by the probe irradiating portion 114 and photodetector portion 116 placed about the measurement point P0 as shown in FIG. 6. From information about the increase and decrease in the rotation radius r, the signal processing portion at a later stage and the computer 136 determine the distance between the measurement sample surface 112 and the probe 118.

Since the vertical component of the atomic force acting between the measurement sample surface 112 and the probe 118 is detected as the increase and decrease in the rotation radius r for measuring the distance between the measurement sample surface 112 and the probe 118, the sensitivity of detection can be improved in the atomic force microscope in accordance with this embodiment as compared with the case where the lateral shift component, i.e., shear force, is employed.

Also, though there have conventionally been restrictions concerning the number and arrangement of detecting means when the probe is uniaxially vibrated on the measurement sample surface, the vertical component of atomic force acting between the measurement sample surface 112 and the probe 118 is detected as the increase and decrease in the rotation radius r in the probe microscope in accordance with this embodiment, whereby there would be no restrictions concerning the number and arrangement of the detecting means.

Therefore, in this embodiment, a desirable number of detecting means, detecting portions 116 in particular, can be arranged at given positions about the measurement point P0 shown in FIG. 6, for example, whereby an improvement in the freedom in arrangement of detecting portions 116, which has conventionally been quite difficult to attain, can be achieved, and the sensitivity of detection can be improved if the number of detecting portions 116 is increased.

Also, since the probe 118 is rotated while flexing the tip portion 118a so as to draw a circle having a size corresponding to the increase and decrease in the atomic force acting between the sample and the probe, the microscope 120 in accordance with this embodiment can favorably carry out isotropic measurement regardless of the scanning direction of the measurement sample surface 112, which has been quite difficult in the case using shear force or the like.

Without being restricted to the above-mentioned configuration, the probe microscope of the present invention can be modified in various manners within the gist of the invention.

For example, it is preferred that the microscope in accordance with this embodiment additionally include the following various mechanisms in place of those employed in typical measurement systems.

Feedback Detector

For example, the transmitted or reflected probe light L2 from the probe 118 is detected by a PIN photodiode with or without a lens, or the like in general. As this lens, a spherical or aspherical lens is employed.

When a lens is used, however, not only lateral light which can enhance the sensitivity of the detecting means, but also vertical light is collected.

As a consequence, the amplitude of the probe or the sensitivity of detection of rotation radius decreases, thereby leaving a room for improvement in this point.

Figure 7:
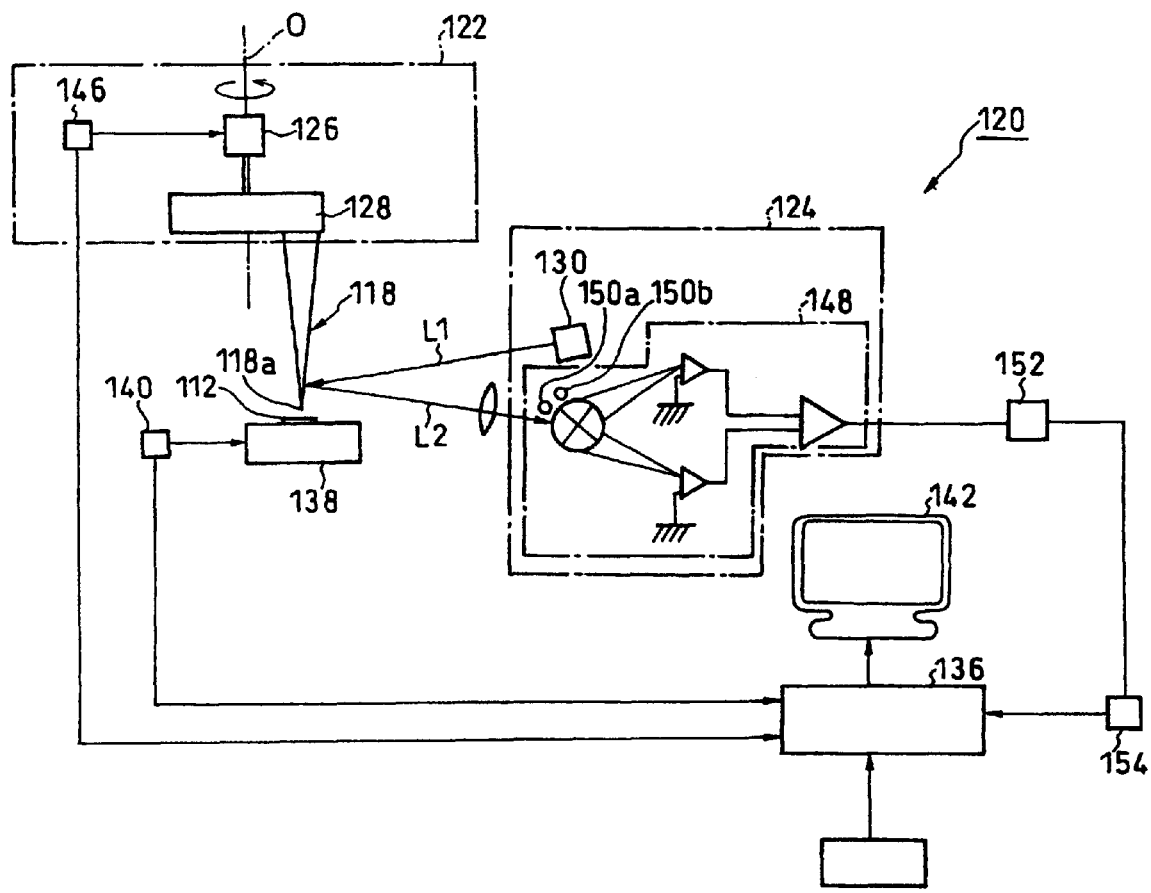
FIG. 7 is an explanatory view of a probe vibrating mechanism and a circle size detecting mechanism which are preferable in the microscope in accordance with an embodiment of the present invention.

Therefore, the microscope in accordance with this embodiment is preferably provided with an feedback detector 148 shown in FIG. 7, for example.

In the feedback detector 148 shown in this drawing, the transmitted or reflected probe light L2 from the probe 118 is detected by position sensors 150*a*, 150*b* such as divided type photodiode divided into two or more, a difference between their two light quantities is detected, and the increase and decrease in the rotation radius r of the probe 118 is detected from this difference.

As a result, when the feedback detector 148 shown in this drawing is employed, the transmitted or reflected probe light L2 can be differentially detected, whereby sensitivity can be improved greatly in the microscope in accordance with this embodiment.

Also, when the feedback detector 148 shown in this drawing is employed, only the light from lateral directions can be collected, whereby the sensitivity of detection of the rotation radius r of the probe 118 can be enhanced in this embodiment.

Signal Circuit

For example, in a typical shear force method in which a probe is uniaxially vibrated on the measurement sample surface, the signal of detecting means for detecting the movement of the probe has usually been locked in at a frequency of a signal for moving the probe, so that the signal of the detecting means is turned into DC.

However, it takes time to carry out the lock-in, thereby hindering probe microscopes from effecting high-speed detection. Also, phase adjustment is necessary for accurately carrying out the lock-in, which consumes labor for measurement, thus leaving a space for improvement in this point.

Hence, it is also preferred that the microscope in accordance with this embodiment be provided with an feedback signal circuit 152 shown in FIG. 7.

The feedback signal circuit 152 shown in this drawing converts the amplitude intensity of the signal obtained by the feedback detector 148 into DC.

Employed as the feedback signal circuit 152 is one circuit selected from the group consisting of an absolute value circuit for yielding an effective value, an RMS/DC converter, and the like, for example.

As a result, when the microscope in accordance with this embodiment is provided with the feedback signal circuit 152 shown in this drawing, the signal obtained by the feedback detector 148 can be turned into DC in a smaller size as compared with the case where typical lock-in is carried out.

Also, since it is not necessary to adjust the phase and the like for measurement, the measurement system as a whole can attain a higher speed.

Feedback Circuit

For example, in microscopes, atomic force microscopes in particular, their feedback circuit for scanning responds uniformly regardless of whether the atomic force is greater or smaller with respect to the change in atomic force.

Hence, it is disadvantageous in that the accuracy becomes unnecessarily high when the atomic force is so small that accuracy is not required, whereas the accuracy becomes insufficient when the atomic force is large, thus leaving a space for improvement.

Therefore, it is also preferred for the microscope in accordance with this embodiment to be provided with a feedback circuit 154 shown in FIG. 7.

The feedback circuit 154 shown in this drawing logarithmically or exponentially responds to the change in atomic force.

As a result, when the feedback circuit 154 shown in this drawing is provided, the microscope in accordance with this embodiment can logarithmically or exponentially respond to the change in atomic force, whereby feedback can be carried out with thinning when the atomic force is smaller and with a higher density when the atomic force is larger.

Namely, when the feedback circuit 154 shown in this drawing is provided, the microscope in accordance with this embodiment can carry out appropriate feedback with a low accuracy when the atomic force is so small that accuracy is not required and with a high accuracy when the atomic force is so large that accuracy is needed, whereby the accuracy in measurement can be enhanced efficiently.

Also, when the feedback circuit 154 shown in this drawing is employed, the density of feedback becomes higher when the atomic force is larger, whereby the feedback can attain a higher speed and better stability.

Feedback Adjustment Display Mechanism

For example, upon adjustment of a detector for detecting probe position or a light source and the like, the probe microscope is usually adjusted such that, while monitoring a signal used for controlling the distance between a probe and a sample, the monitored signal is optimized, or is adjusted while it is verified by a visual inspection that light enters the detector.

However, the signal used for controlling the distance between the probe and the sample includes various signal components of not only positional relationships between the detector for detecting probe position, the light source, and the probe, but also the distance between the probe and the sample, and the like.

As a consequence, the adjustment cannot be carried out intuitively, which makes the procedure of adjustment complicated and difficult, thereby yielding a strong demand for improvement.

Hence, this embodiment is provided with the monitor 142, such as the one shown in FIG. 7, which can distinctively display signals of a plurality of photodetectors or the signal of a divided detector itself, the personal computer 136 capable of the above-mentioned adjustment on the basis of the display on the monitor 142, and the like.

Thus, the microscope in accordance with this embodiment is provided with the monitor 142, computer 136, and the like shown in FIG. 7, signals of a plurality of photodetectors and the like are distinctively displayed on the monitor 142, and the above-mentioned adjustment is carried out by the computer 136 according to the display of the monitor 142, whereby the positional relationship between the photodetectors and the probe light L1 can directly be seen with the eye, thus facilitating the above-mentioned adjustment, which has conventionally been quite difficult.

Vibrating Means and Detecting Means

Though the above-mentioned configuration relates to an example using the intensity change of reflected or transmitted probe light L2 from the probe 118 for detecting the increase and decrease in rotation radius r, the microscope of the present invention is not restricted thereto. For example, one member selected from the group consisting of a quartz vibrator and a piezoelectric element (PZT) may be used instead.

Also, though the above-mentioned configuration relates to an example using a motor as the vibrating means, the microscope of the present invention is not restricted thereto, and a piezoelectric element or the like can be used instead, for example.

Figure 8:
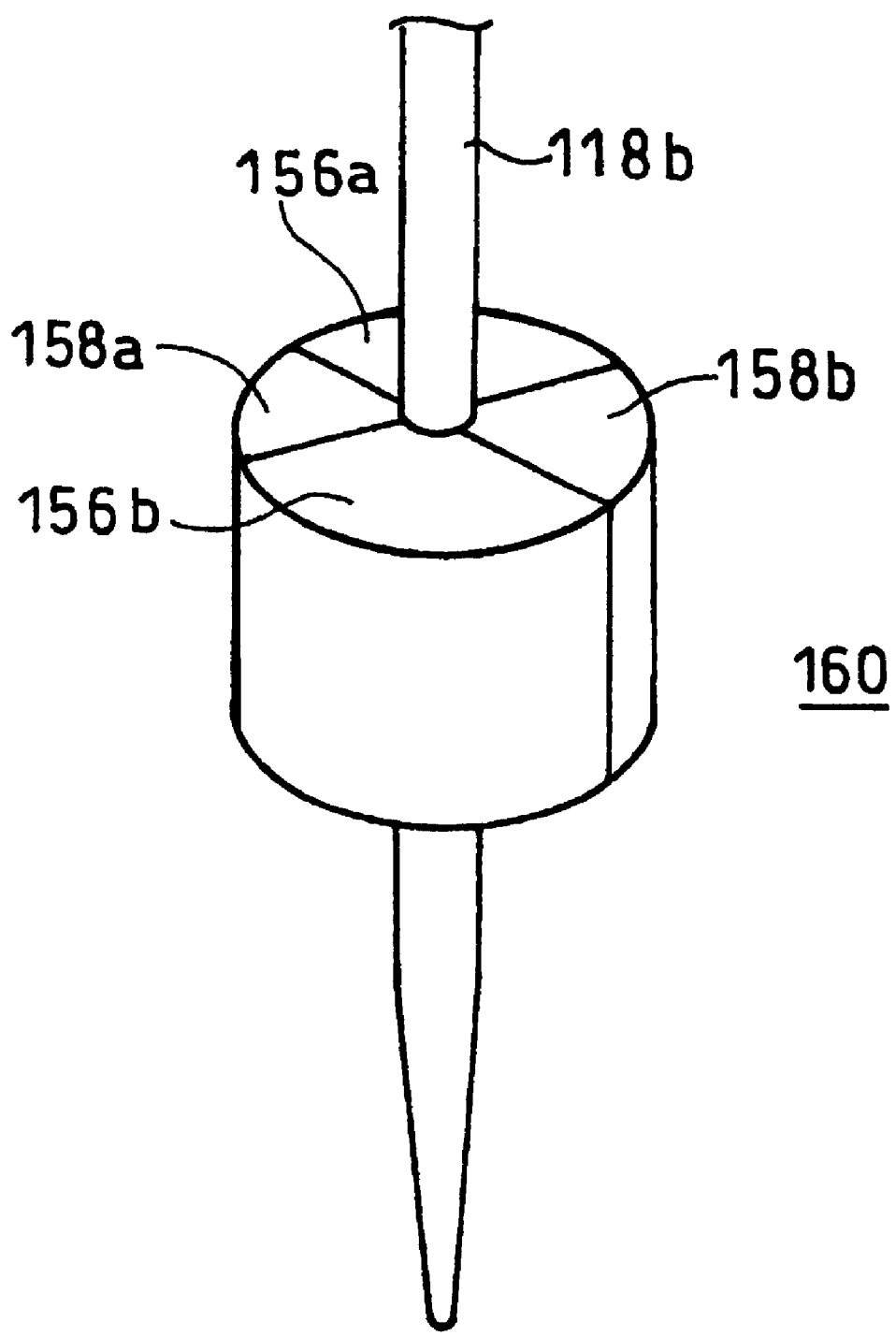
FIG. 8 is an explanatory view of the probe vibrating mechanism and circle size detecting mechanism, which are preferable in the microscope in accordance with an embodiment of he present invention.

Here, as the piezoelectric element, the microscope in accordance with this embodiment preferably uses, as shown in FIG. 8, a divided type cylindrical piezoelectric element 160, divided into four or more, for example, having a vibrating electrode pair 156a, 156b placed face to face as the vibrating means and a detecting electrode pair 158a, 158b placed face to face as the detecting means, which are arranged alternately over substantially the whole periphery on the rear end side 118b of the probe.

In this case, it is also preferred that the personal computer 136 and the like, as the control means, cause the vibrating electrode pair 156a, 156b to vibrate the probe 118 and the detecting electrode pair 158a, 158b to detect the increase and decrease in the rotation radius r simultaneously or alternately in a time series.

As a consequence, space can be saved more as compared with the case where the vibrating means and the detecting means are provided independently from each other, whereby the apparatus can be made smaller.

Feedback Optical System

In the optical system of the probe microscope, for detecting the increase and decrease in the rotation radius r, probe light such as laser light is collected and irradiated from a distance, and the reflected probe light is captured by a detecting portion at a distance, whereby space is needed in at least two directions about the probe 118. Also, it is necessary to adjust the positions of both of the probe light and detecting portion every time the probe 118 is replaced.

Also, in order for probe light to reach the probe tip portion, it is necessary that no obstacles exist near the probe tip portion, which hinders measurement under a specific condition such as underwater measurement, thereby leaving a room for improvement in probe microscopes necessitating various kinds of measurement.

Figure 9:
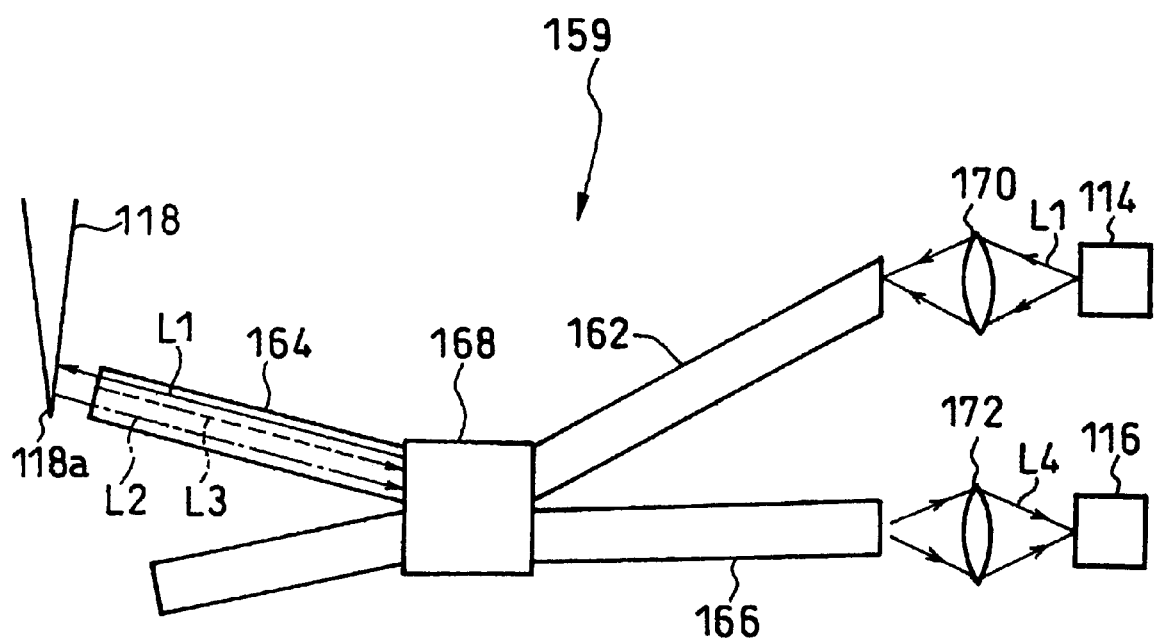
FIG. 9 is an explanatory view of the circle size detecting mechanism, which is preferable in the microscope in accordance with an embodiment of the present invention; invention.

Therefore, it is also preferred that the probe microscope in accordance with this embodiment be provided with an feedback optical system 159 shown in FIG. 9.

The feedback optical system 159 shown in this drawing includes a probe irradiating portion 114, optical fibers 162, 164, 166, a fiber coupler 168 with 1:1 fiber branching, a photodetector portion 116, and lenses 170, 172, in which the optical fiber 164 detects the number of vibrations and amplitude of the probe 118 through interference.

Namely, in the feedback optical system 159 shown in this drawing, the wavelength of interference light L4 formed between reflected probe light L2 from the probe 118 and reflected light L3 at an end face of one fiber 164 branching out from the fiber coupler 168 is detected by the photodetector portion 116, whereby the increase and decrease in the rotation radius r of the probe 118 is detected.

As a result, when the feedback optical system 159 shown in FIG. 9 is used, for detecting the increase and decrease in the rotation radius r of the probe 118, it will be sufficient if the end face of the optical fiber 164 is placed very near the probe tip portion 118a, whereby optical observation from a distance is unnecessary.

When the feedback optical system 159 shown in this drawing is employed in the probe microscope in accordance with this embodiment, adjusting one location of the end face of the optical fiber 164 is sufficient for adjustment upon probe replacement.

Also, when the feedback optical system 159 shown in this drawing is employed, it will be sufficient if the end face of the optical fiber 164 and the probe 118 are placed under a given atmosphere, whereby the probe microscope in accordance with this embodiment does not select its measurement environment.

Automating Mechanism for Setting Probe Vibrating Frequency

For setting the resonance frequency of the probe, a commonly employed technique comprises the steps of measuring the resonance frequency by a certain method and then setting the probe vibrating frequency by separate means.

However, it is necessary for the user to carry out at least two operations in this case, which leaves a room for improvement.

Figure 10:
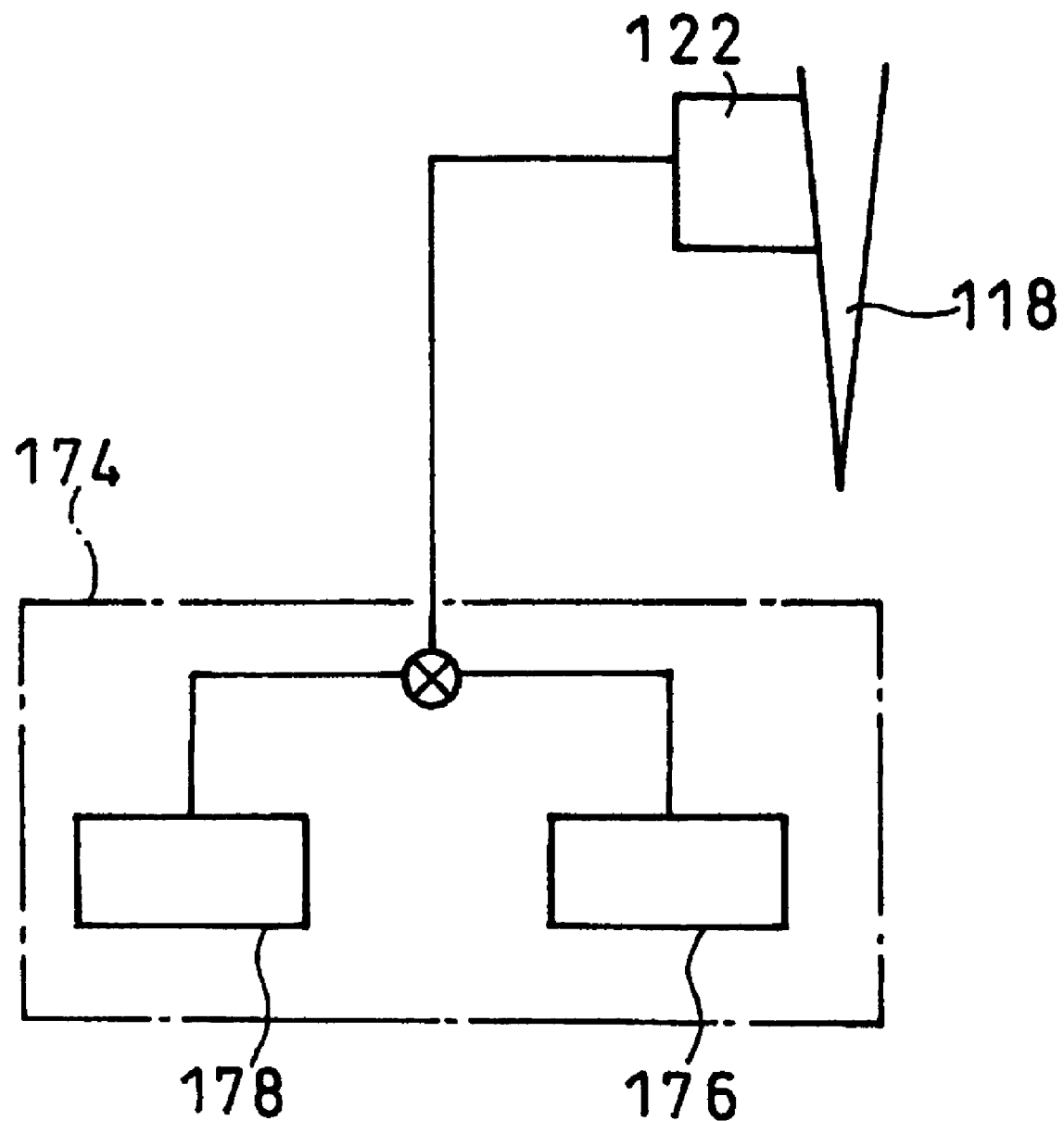
FIG. 10 is an explanatory view of a probe vibrating frequency setting mechanism which is preferable in the microscope in accordance with an embodiment of the present invention.

Therefore, it is preferred that the probe microscope in accordance with this embodiment be provided with a probe vibrating frequency setting mechanism 174 shown in FIG. 10, so as to automate the setting.

Namely, the probe vibrating frequency setting mechanism 174 shown in this drawing includes a white-noise generator 176 and a sine-wave generator 178.

Signals from these generators 176, 178 are supplied to vibrating means 122 such as a piezoelectric element (PZT).

Namely, in the probe vibrating frequency setting mechanism 174 shown in this drawing, the probe vibrating signal is changed over to the white noise from the white-noise generator 176, so as to set the resonance frequency, or different frequencies from the sine-wave generators 178 are sequentially added to the vibrating signal, so as to measure the resonance frequency, and then the calculated resonance frequency is set.

Thus, when the probe vibrating frequency setting mechanism 174 shown in FIG. 10 is employed, the probe microscope in accordance with this embodiment can measure and set the resonance frequency in a single operation, thereby facilitating the operation.

Stage

For example, since probe microscopes cannot move their probe position, they use a technique in which the probe position is fixed without scanning the probe, whereas a stage is scanned, so as to scan the measurement sample surface.

Figure 11:
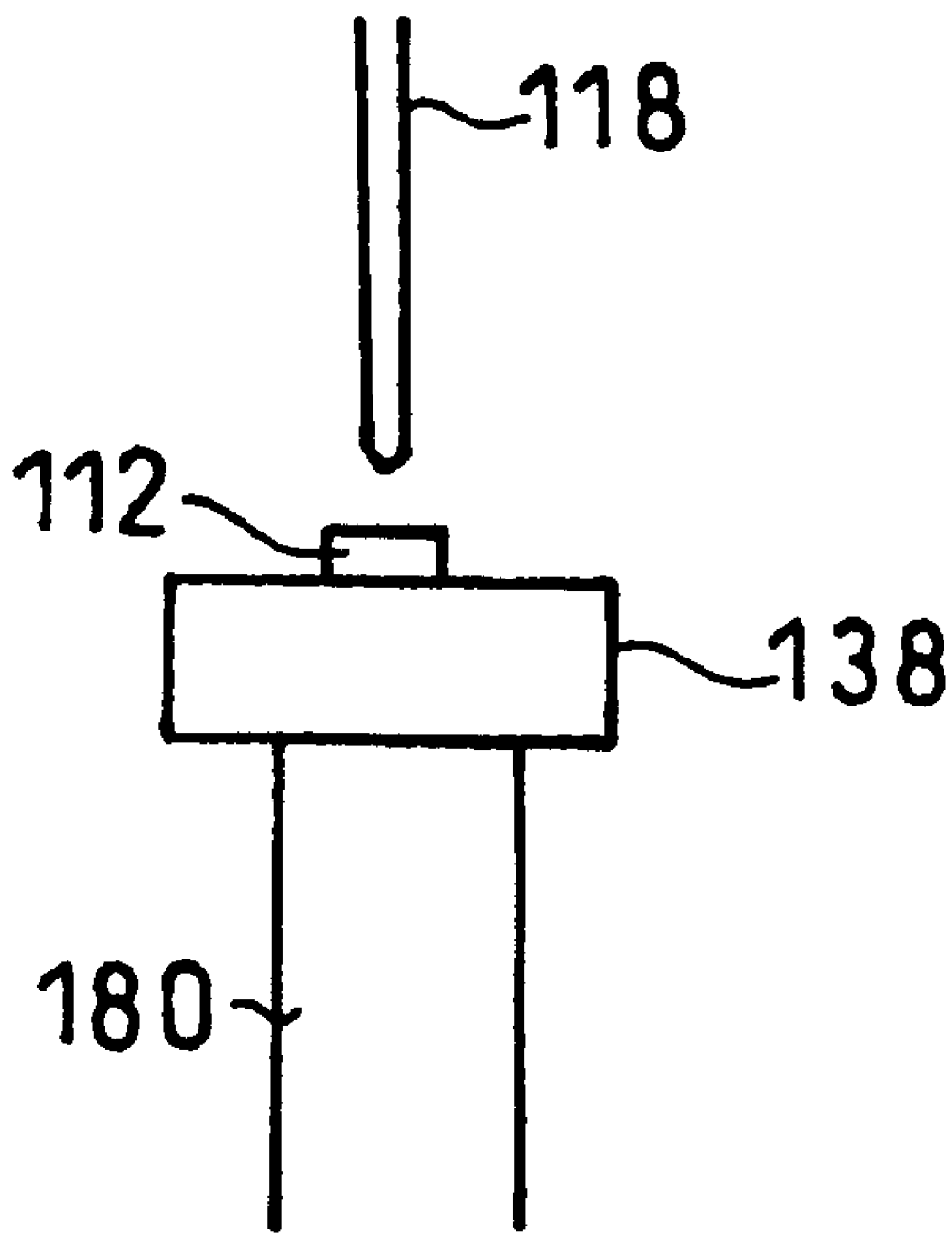
FIG. 11 is an explanatory view of a problem in a conventional sample stage.

Hence, as a typical sample stage for the probe microscope, there has been known an arrangement in which, as shown in FIG. 11, for example, a piezoelectric element (PZT) 180 in a cylindrical form or the like rises from the lower side, and a stage 138 for the measurement sample 112 is placed on the piezoelectric element 180.

When such a stage is used, however, the head as a whole has larger dimensions, thereby deteriorating its stability against temperature.

Figure 12:
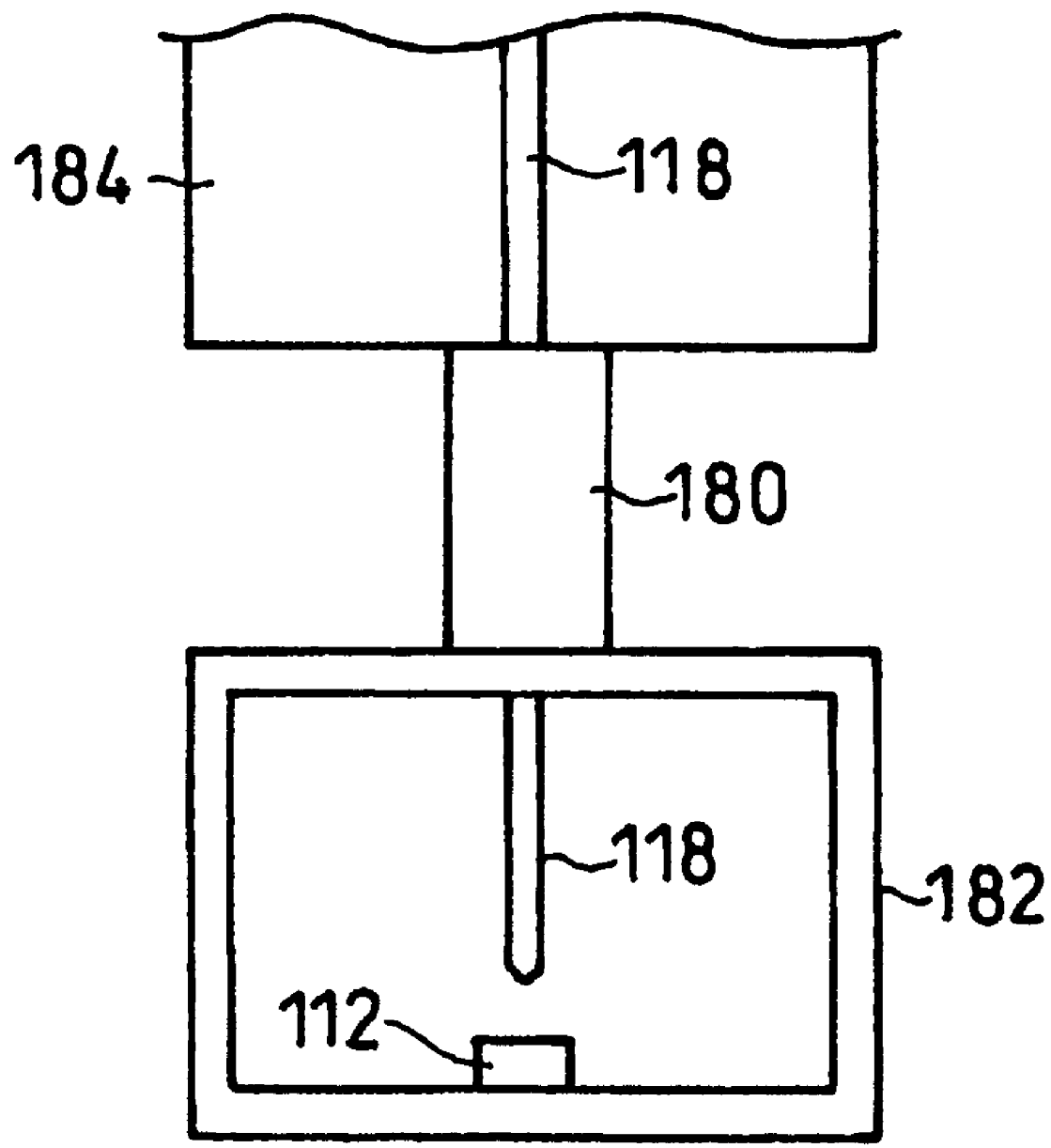
FIG. 12 is an explanatory view of a problem in a conventional sample stage.

This sample stage may employ a technique in which the piezoelectric element 180 is hung from the upper side as shown in FIG. 12.

In this case, however, a tensile stress may act on the piezoelectric element 180, so that the joint surfaces between the piezoelectric element 180 and its respective support members 182, 184 or the piezoelectric element 180 itself may break, thus leaving a room for improvement.

Figure 13A:
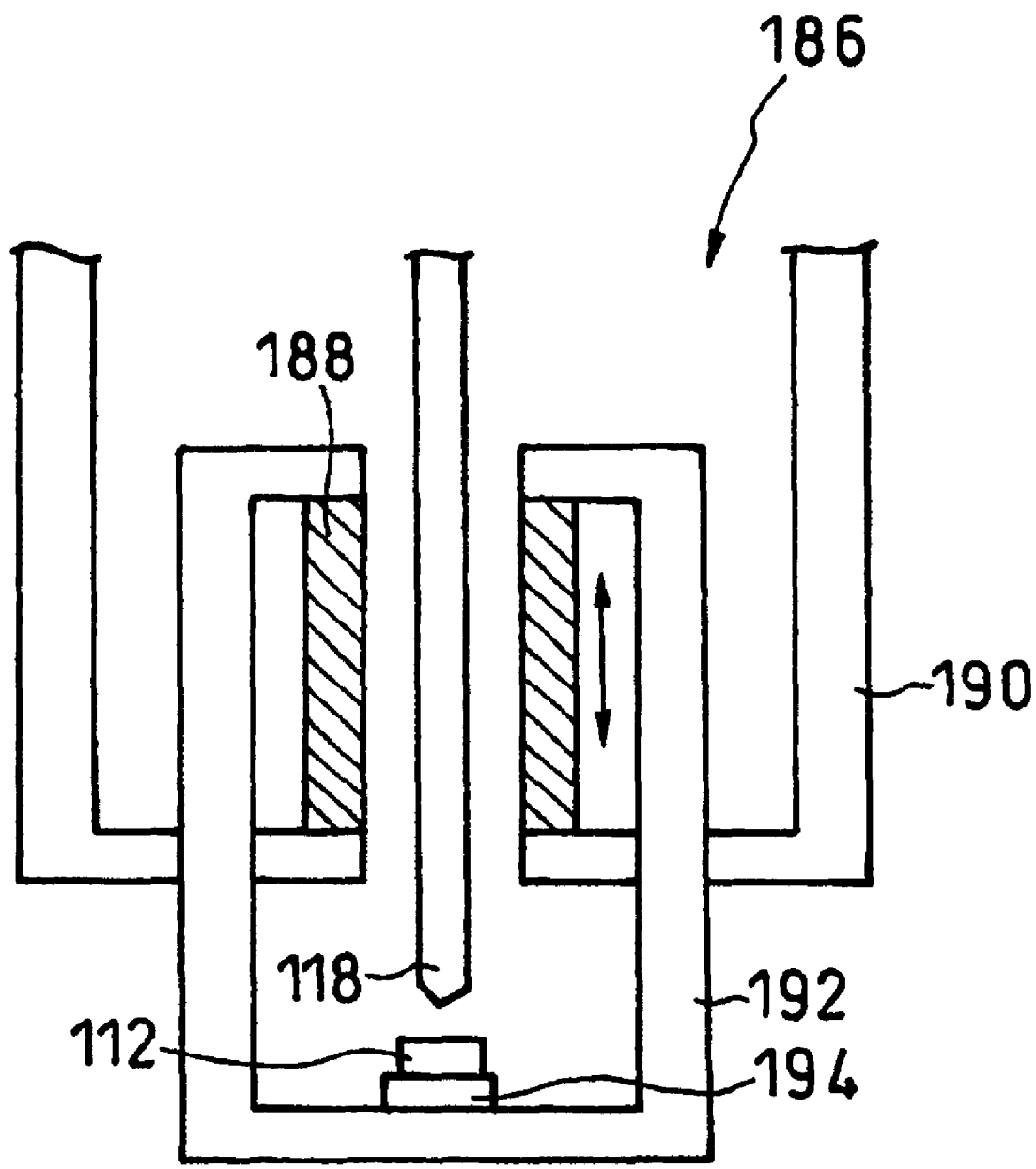
FIGS. 13A and 13B are explanatory views of a schematic configuration of a sample stage which is preferable in the microscope in accordance with an embodiment of the present invention.
Figure 13B:
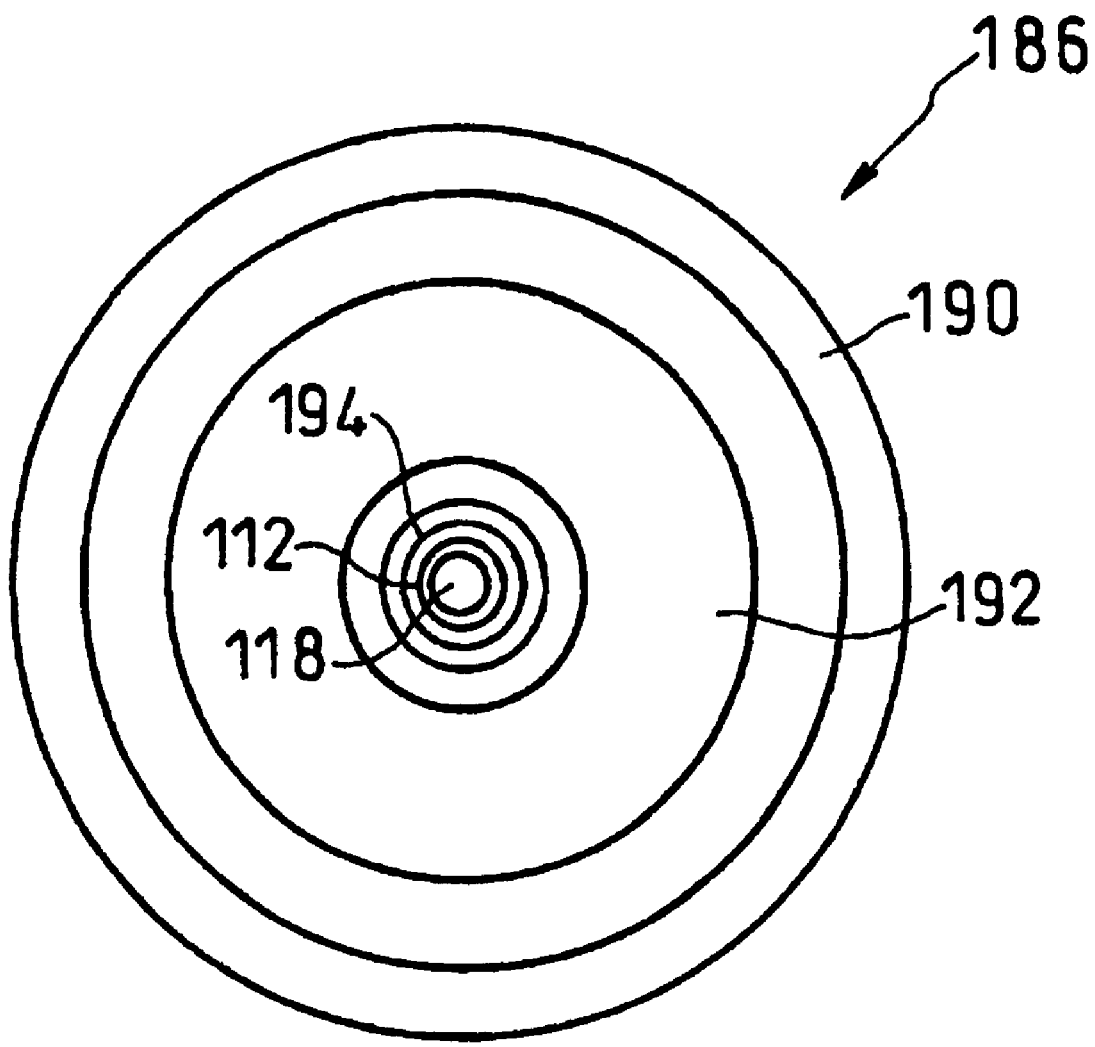
Figure 14:
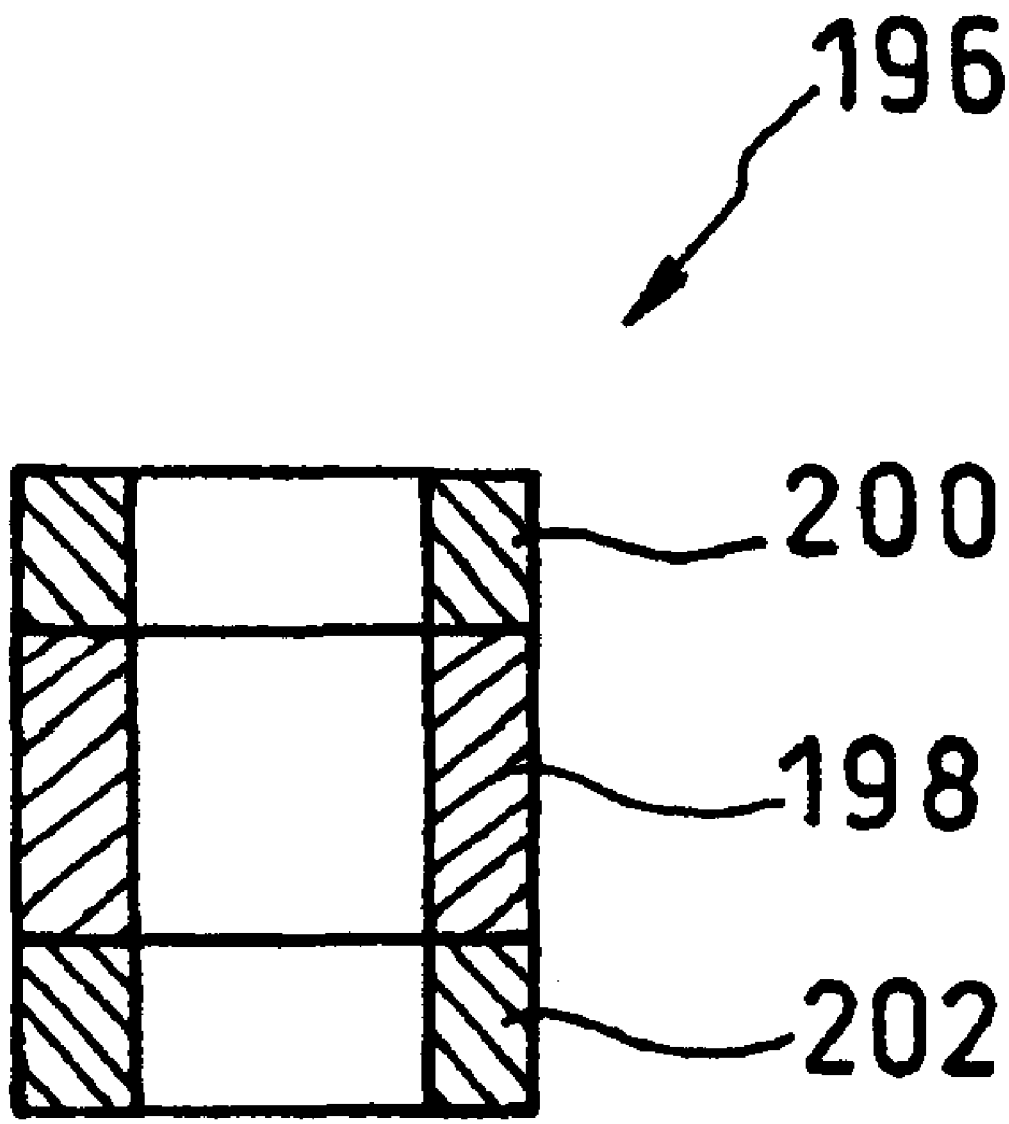
FIG. 14 is an explanatory view of a schematic configuration of a sample stage which is preferable in the microscope in accordance with an embodiment of the present invention.

Therefore, while the probe microscope in accordance with this embodiment can use the above-mentioned typical stage at least, it is also preferred that sample stages shown in FIGS. 13A, 13B, and 14, for example, be used instead.

Here, FIG. 13A is a vertical sectional view of the stage, whereas FIG. 13B is a top plan view thereof.

Namely, in the sample stage 186 shown in these drawings, an upper support member 190 and a lower support member 192 are placed so as to hold a cylindrical piezoelectric element 188 as a driving mechanism therebetween, and the probe 118 is inserted through the respective hollow portions of the cylindrical piezoelectric element 188 and support members 190, 192.

Also, a sample table 194 is placed on the support member 192, such that the support members 190, 192 always apply a compressive stress onto the piezoelectric element 188.

Thus, when the sample stage 186 shown in these drawings is employed, the hollow portion of the cylindrical piezoelectric element 188 as a driving mechanism can effectively be utilized as a space for the probe in the microscope in accordance with this embodiment, whereby the head itself can be made compact. As a consequence, the stability against temperature is improved.

Also, when the sample stage 186 shown in these drawings is employed in this embodiment, a compressive stress always acts on the piezoelectric element 188, whereby the joint surfaces between the piezoelectric element 188 and the individual support members 190, 192 or the piezoelectric element 188 itself can be prevented from breaking.

Further, in this embodiment, since the individual constituents have similar structures arranged concentrically, multi-axial operations with a long moving distance is possible.

While any piezoelectric element can be employed as the piezoelectric element 188, it is also possible to use one piezoelectric element, for example, selected from the group consisting of a five-divided circular piezoelectric element adapted for driving in vertical directions and biaxial driving in horizontal plane directions, a cylindrical piezoelectric element of a laminate type (doughnut type) adapted for vertical driving, and a four-divided piezoelectric element adapted for biaxial driving in horizontal plane directions.

Structure of Sample Stage

As the driving mechanism for a minutely movable three-axis stage and probe position, the five-divided cylindrical piezoelectric element, an assembly of three laminate-type piezoelectric elements arranged orthogonal to each other, an assembly of a four-divided cylindrical piezoelectric element (X, Y) and three laminate type piezoelectric elements vertically aligned at positions different from that of the four-divided cylindrical piezoelectric element as a Z-axis driving mechanism, and the like are used.

Among them, it is necessary for the five-divided cylindrical piezoelectric element to be vertically elongated in order to earn the amount of driving along Z axis, whereby drift easily occurs upon changes in temperature.

Also, for earning the amount of movement, it is necessary that the thickness be as small as possible, which remarkably lowers the resonance frequency, whereby the position cannot be moved at a high speed.

In the assembly in which three laminate-type piezoelectric elements are arranged orthogonal to each other, the form of assembly is asymmetrical, so that asymmetrical drift may occur.

In an assembly of a four-divided cylindrical piezoelectric element (X Y) and three laminate type piezoelectric elements vertically aligned at positions different from that of the four-divided cylindrical piezoelectric element as a Z-axis driving mechanism, an enormous space is necessary for disposing it.

Also, since the three laminate-type piezoelectric elements acting as Z axis do not always have the same amount of movement, there is a risk of inclinations occurring along with the movement, and there is a possibility of the piezoelectric elements breaking, thus leaving a room for improvement.

Therefore, it is also preferred for the microscope in accordance with this embodiment to use a driving mechanism 196 shown in FIG. 14.

In the driving mechanism 196 shown in this drawing, a bored type laminate piezoelectric element 198 adapted for vertical driving and four-divided cylindrical piezoelectric elements 200, 202, adapted for biaxial driving in horizontal plane directions and placed close to the former from the upper and lower sides thereof, are integrated with each other.

As a consequence, when the driving mechanism 196 shown in FIG. 14 is employed in this embodiment, then the same range of driving can be secured even if the total length of the driving mechanism as a whole is made shorter, whereby the thermal drift occurring due to the temperature change in the piezoelectric element can be made much lower than that in the case where a five-divided cylindrical piezoelectric element is used, for example.

Also, when the driving mechanism 196 shown in FIG. 14 is employed in this embodiment, then the thickness of the upper and lower driving portions becomes much greater than that in the case where a five-divided cylindrical piezoelectric element is employed, so that the resonance frequency of the piezoelectic element as a whole increases remarkably, whereby the sample stage can be driven at a higher speed.

Further, when the driving mechanism 196 shown in FIG. 14 is employed in this embodiment, then a concentric structure is provided, whereby mechanical drift in horizontal plane directions can be made much lower than that in the structure in which laminate-type piezoelectric elements are assembled in three directions.

Without being restricted to the driving mechanism for the sample stage and the like, the driving mechanism 196 shown in FIG. 14 can also be used for driving the probe position as well.

Sample Exchanging Mechanism

For exchanging measurement samples, various methods have conventionally been used. For example, a method in which a sample stage is inserted into a microscope along a V-shaped groove from beside the microscope, or the like is commonly used.

Since the structure lacks symmetry, however, drift may occur in unexpected directions in this case.

Also, since the surface of the sample stage is determined in this case, the absolute position of the sample surface may vary depending on the thickness of the sample.

Further, since the surface of the sample stage is defined in this case, the thickness of the measurable sample is limited. These issues leave a room for improvement in probe microscopes such as atomic force microscopes and near-field optical microscopes which scan the sample surface by driving the stage.

Figure 15A:
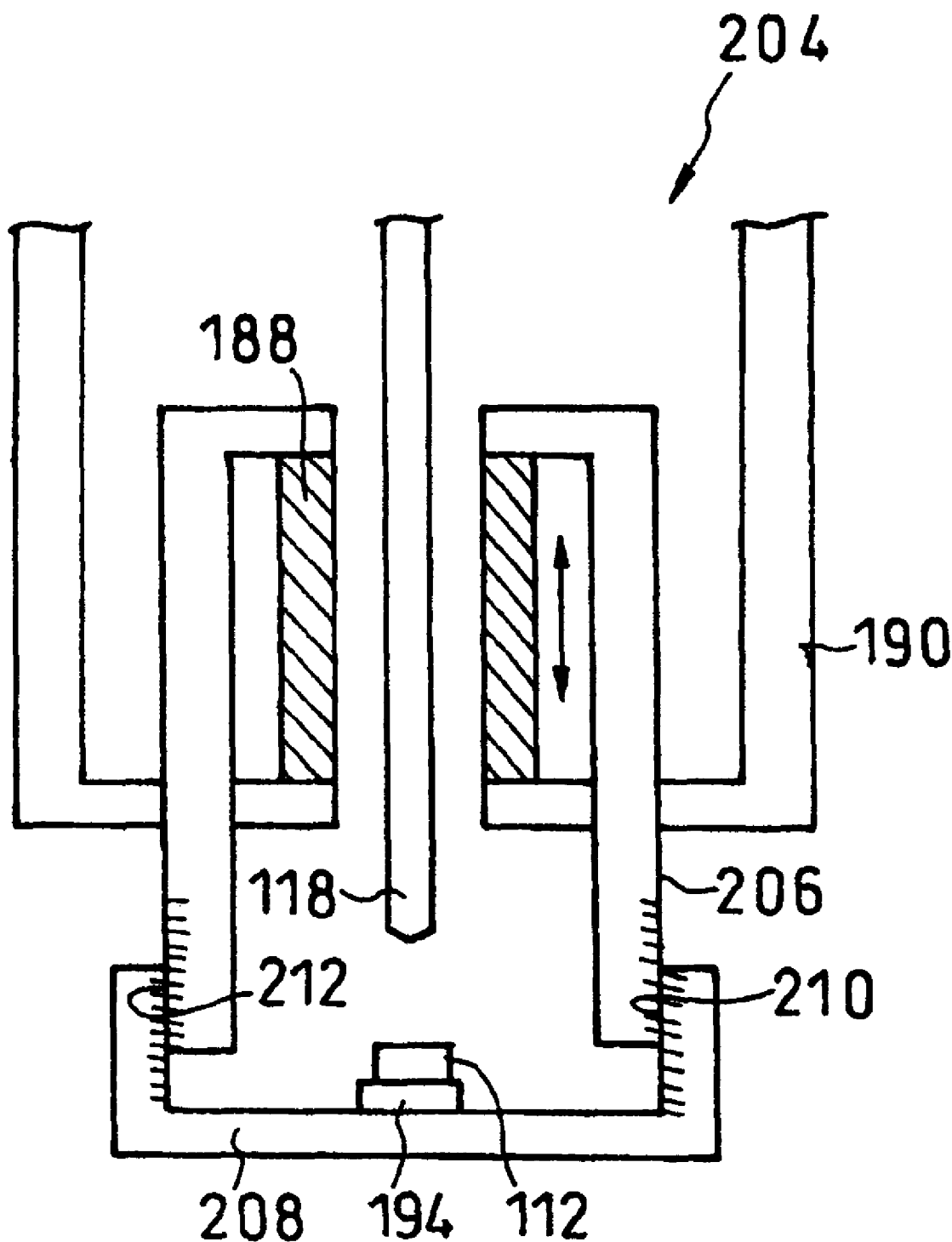
FIGS. 15A and 15B are explanatory views of a schematic configuration of a sample exchanging mechanism which is preferable in the microscope in accordance with an embodiment of the present invention.
Figure 15B:
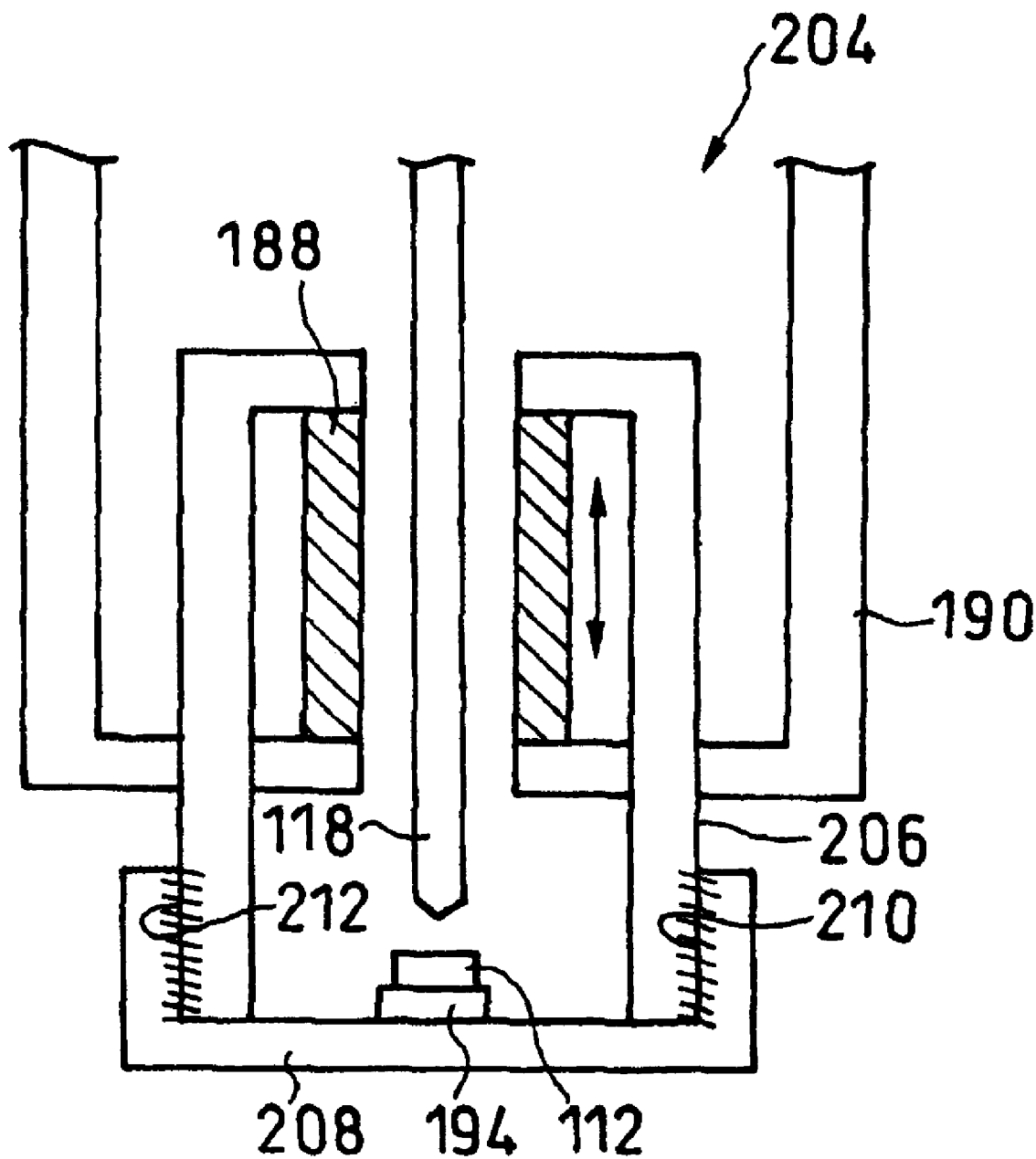

Hence, it is also preferred for the probe microscope in accordance with this embodiment to use a sample stage 204 shown in FIGS. 15A and 15B.

Namely, in the sample exchanging mechanism 204 shown in these drawings, both of support members 206, 208 are directly formed with threaded groves 210, 212, respectively, so that they can be brought into threaded engagement with each other.

Also, in the sample exchanging mechanism 204 shown in these drawings, the support members 206, 208 are made sufficiently thick. As a consequence, if the amount of threading insertion of the support members is adjusted, then the height of the stage can be adjusted.

For example, if the support member 208 is further threaded into the support member 206 in the state shown in FIG. 15A, the probe 118 and the measurement sample 112 can approach each other as shown in FIG. 15B.

Also, the sample exchanging mechanism 204 shown in these drawings is provided with a through hole on the lower side of the support member 206.

As a consequence, in the sample exchanging mechanism 204 shown in these drawings, the optical sample observation, light irradiation, light collection, and the like can be carried out through the through hole on the lower side of the support member 206.

Thus, when the sample exchanging mechanism 204 shown in these drawings is employed, horizontal drift is reduced in the microscope in accordance with this embodiment since the individual constituents have concentric structures.

Also, when the sample exchanging mechanism 204 shown in these drawings is employed in the microscope in accordance with this embodiment, if the amount of threading insertion of the support member 208 into the support member 206 is adjusted, then the height of the stage can be changed according to the thickness of the measurement sample 112, whereby a wider range of thickness of measurement samples can be measured.

Figure 16:
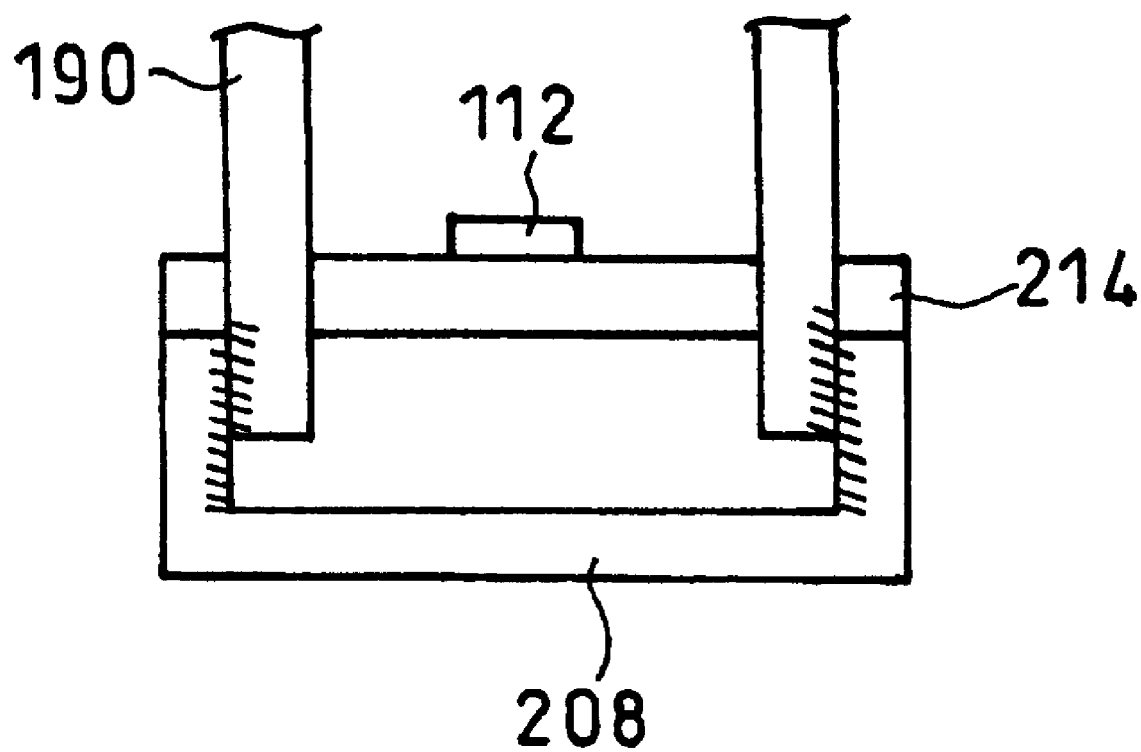
FIG. 16 is an explanatory view of a schematic configuration of a sample exchanging mechanism which is preferable in the microscope in accordance with an embodiment of the present invention.

Here, if a sample table 214 for directly mounting the sample 112 is placed in the middle in addition to the above-mentioned configuration as shown in FIG. 16, so as to secure the sample table 214, then the sample table 214 can be kept from rotating regardless of the rotation of the support member 208.

Probe Exchanging Mechanism

For exchanging probes in a probe microscope such as a near-field optical microscope, for example, it is necessary for a probe and optical fiber being adapted to be inserted through members.

In this case, however, the optical fiber may be tangled or cut, whereby its handling has been difficult.

Also, in this case, there are a stage, a pillar, and the like about the position of the probe, which reduce the space, thereby yielding a structure in which probes are hard to exchange.

Further, when a structure which changes the position of the probe portion is provided for exchanging probes, the resonance frequency as a whole lowers, thereby becoming more susceptible to influences of drift and vibration, thus leaving a room for improvement.

Figure 17A:
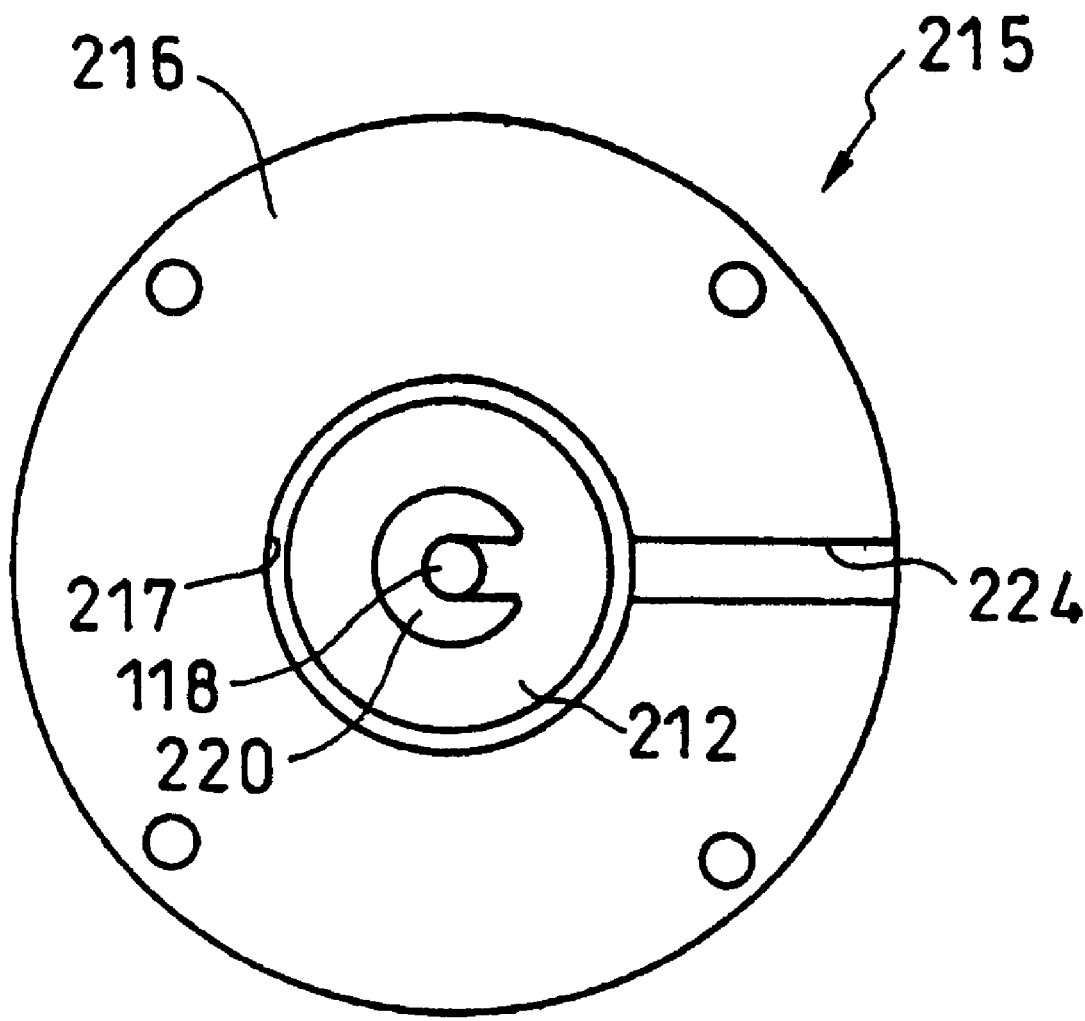
FIGS. 17A and 17B are explanatory views of a schematic configuration of a probe exchanging mechanism which is preferable in the microscope in accordance with an embodiment of the present invention.
Figure 17B:
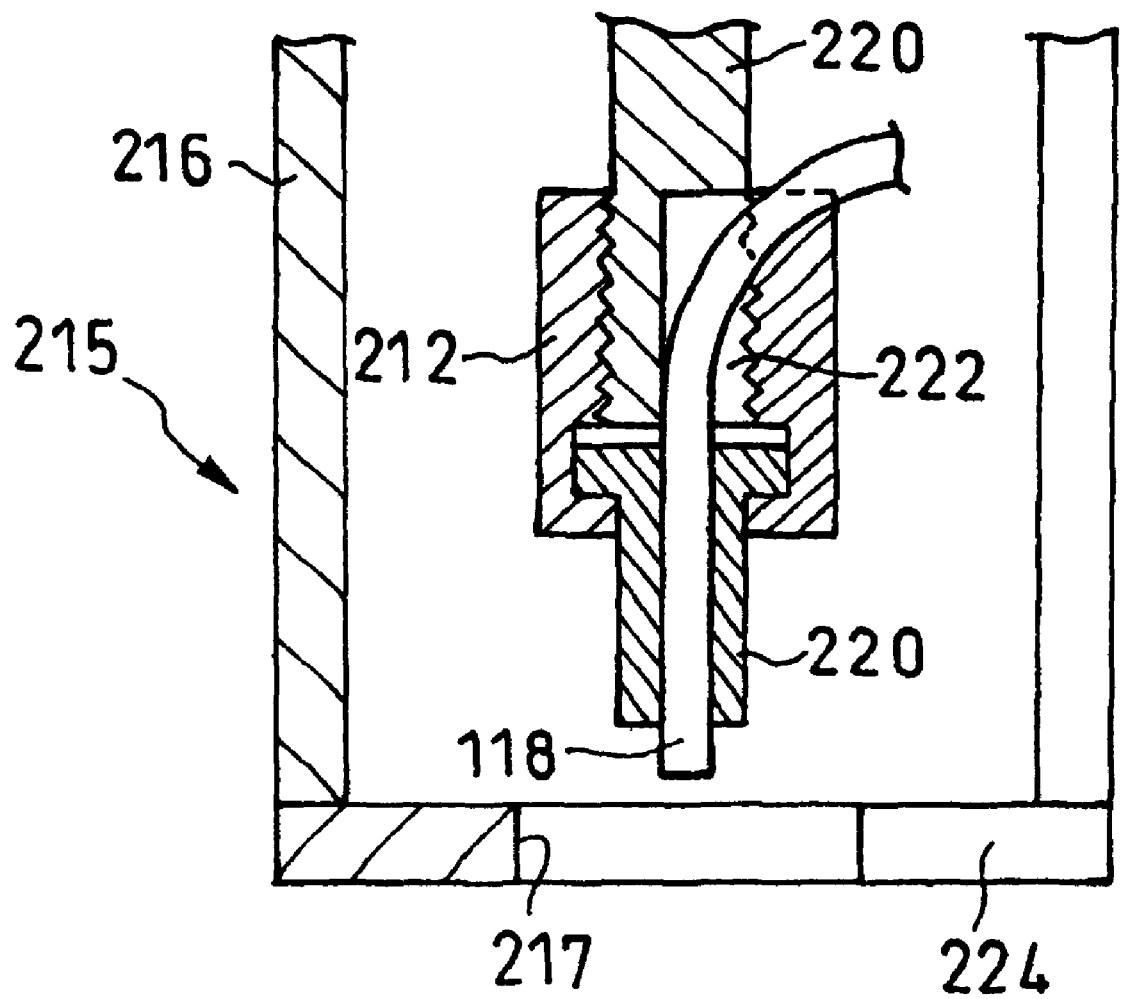

Therefore, the probe microscope in accordance with this embodiment, such as a nearfield optical microscope in particular, preferably uses a probe exchanging mechanism 215 shown in FIGS. 17A and 17B. Here, FIG. 17A is a bottom plan view thereof, whereas FIG. 17B is a vertical sectional view of the same.

Namely, as shown in FIG. 17A, the center part of a sample stage 216 is formed with a sufficiently large through hole 217.

When exchanging probes, the probe 118 is replaced in a state where a probe fixing portion 220 such as the one shown in FIG. 17B penetrates through a stage 216 from the through hole 217 and projects from the lower face of the stage 216.

When the probe exchanging mechanism shown in these drawings is employed in this embodiment, the stage portion 216 and the probe fixing portion 220 are provided with slots 224, 222, respectively, whereby the probe 118 may be inserted through the through hole 217 by use of the slots 222, 224 at the time of replacing the probe 118.

Thus, when the probe exchanging mechanism 215 shown in these drawings is employed in the microscope in accordance with this embodiment, there would be no obstacles about the probe 118 at the time of exchanging probes, whereby the exchange is facilitated.

Also, when the probe exchanging mechanism 215 shown in these drawings is employed in the microscope in accordance with this embodiment, there is no need to provide unnecessary structures for exchange, whereby the structure can be made robust, which is less susceptible to influences of drift and vibration.

Further, when the probe exchanging mechanism 215 shown in these drawings is employed in the microscope in accordance with this embodiment, the probe 118 can easily be attached to the probe fixing portion 220 by way of the slots 222, 224 without tangling optical fibers.

Rough Stage Moving Mechanism (1)

As a rough moving mechanism for a sample stage operating at a low temperature, a piezoelectric element is used in general. Known as a method of driving it, for example, is an inertial driving method in which a sawtooth voltage is applied to a cylindrical piezoelectric element placed orthogonal to an inch work or stage surface.

However, such a driving method cannot carry out positioning accurately since the sample stage operates stepwise.

Also, since the actual amount of movement depends on the friction of the stage, it changes with time. Though the rough moving mechanism can sufficiently be used as a rough moving mechanism for a sample stage in a typical measurement system, there is a room for improving the above-mentioned problem in the case where minute samples and the like are to be handled as well, as in the case of the probe microscope in accordance with this embodiment.

Figure 18:
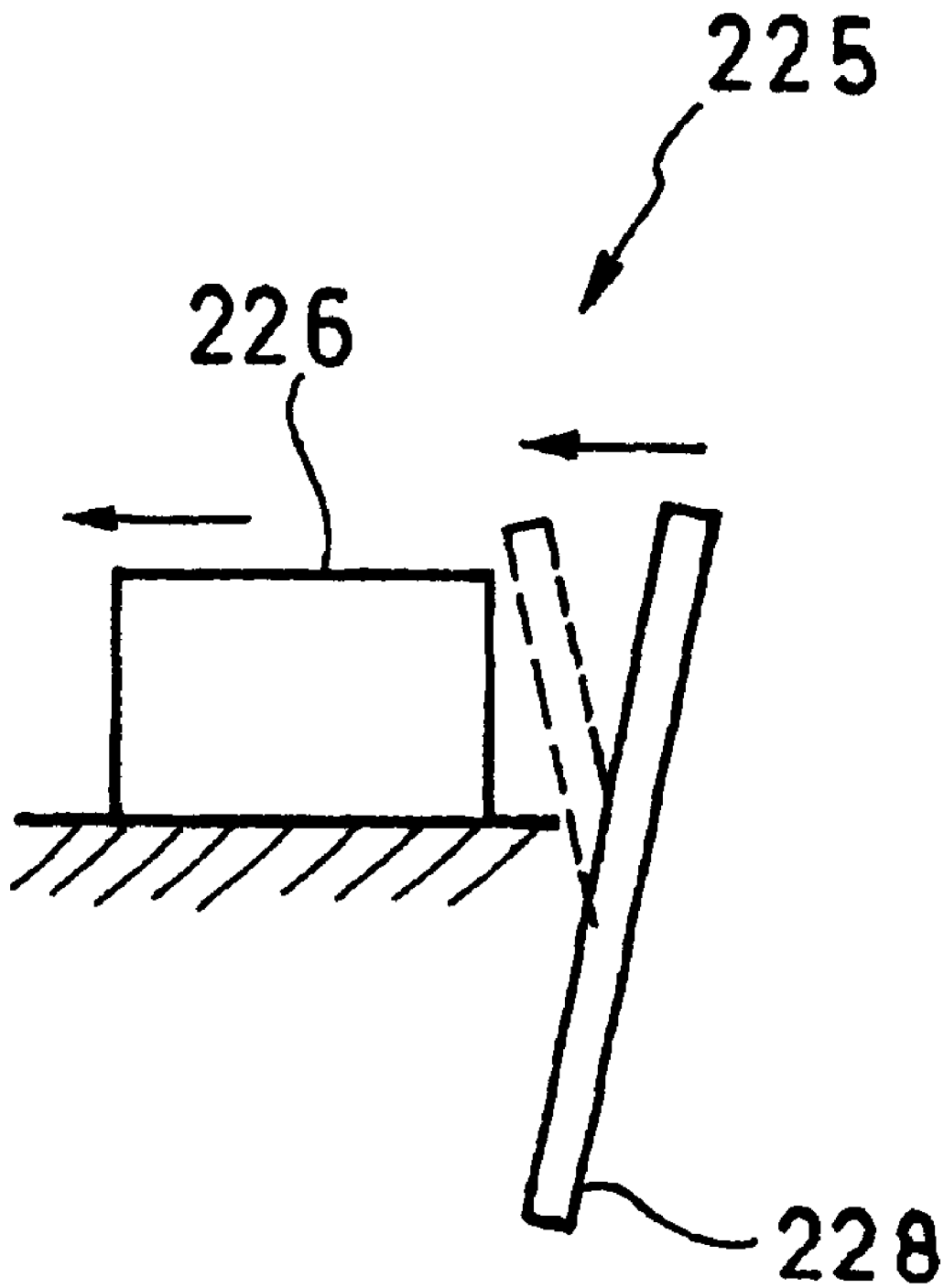
FIG. 18 is an explanatory view of a stage driving mechanism which is preferable in the microscope in accordance with an embodiment of the present invention.

Therefore, it is preferred for the microscope in accordance with this embodiment to use a rough moving stage 225 shown in FIG. 18, for example.

The rough moving stage 225 shown in this drawing drives a stage 226 by pushing one side face thereof with a bimorph 228.

Thus, when the rough moving stage 225 shown in this drawing is employed in the microscope in accordance with this embodiment, as the voltage applied to the bimorph 228 is changed, the bimorph 228 moves toward the stage 226 as indicated by broken lines in the drawing or resumes its original state as indicated by solid lines in the drawing, whereby the stage 226 can smoothly be positioned at a given position in the leftward direction in the drawing.

Also, when the rough moving stage 225 shown in this drawing is used in the microscope in accordance with this embodiment, the amount of movement of the stage 226 depends only on characteristics of the bimorph 228, whereby secular changes can be reduced greatly.

Rough Stage Moving Mechanism (2)

As a rough moving mechanism for a sample stage operating at a low temperature, a piezoelectric element is used in general as mentioned above. Known as a method of driving it, for example, is an inertial driving method in which a sawtooth voltage is applied to a cylindrical piezoelectric element placed orthogonal to an inch work or stage surface.

Since individual members have to be assembled three-dimensionally with respect to the stage surface, such a driving method yields a lower stability against temperature, thereby increasing drift.

Also, the driving direction is limited to linear directions, so that no rotational movement can be attained. While such a rough moving mechanism is sufficiently usable as a rough moving mechanism for a sample stage in a typical measurement system, inconveniences will occur if this rough moving mechanism is used as it is in the case where various kinds of driving are necessary as in the probe microscope in accordance with this embodiment.

Figure 19A:
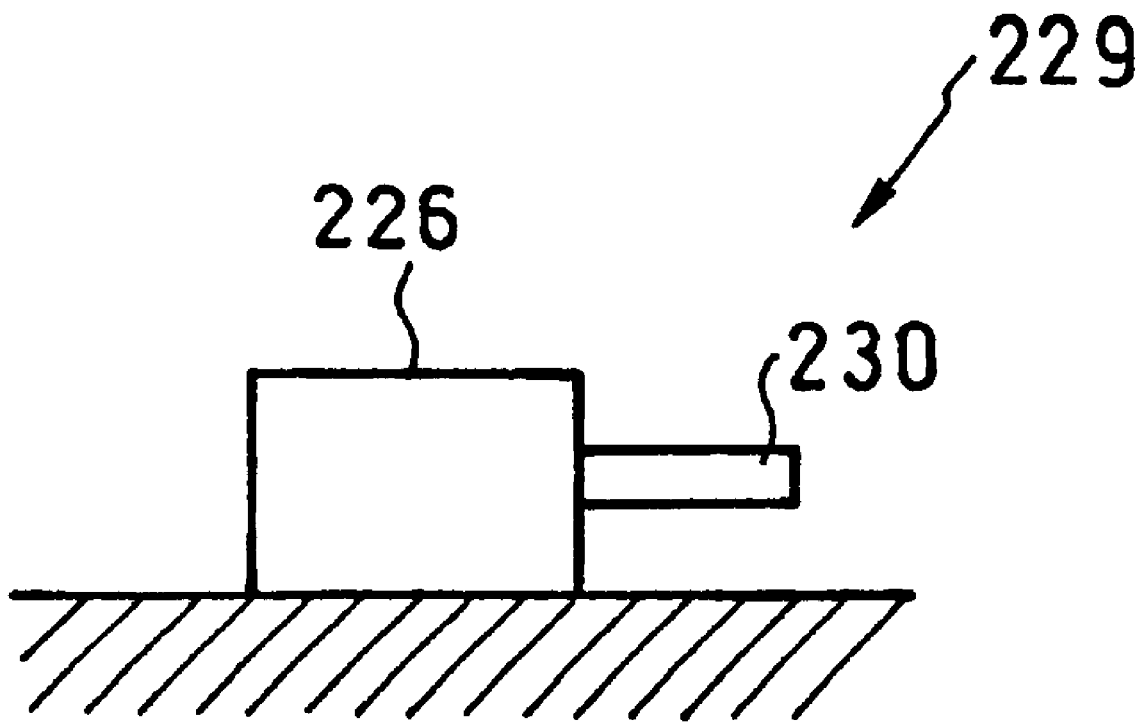
FIGS. 19A and 19B are explanatory views of a schematic configuration of a stage driving mechanism which is preferable in the microscope in accordance with an embodiment of the present invention.

Therefore, it is also preferred for the microscope in accordance with this embodiment to use a rough moving stage 229 shown in FIG. 19A.

The rough moving stage 229 shown in this drawing uses a piezoelectric element 230, directly attached to one side face of the stage 226, having a free end.

Figure 19B:
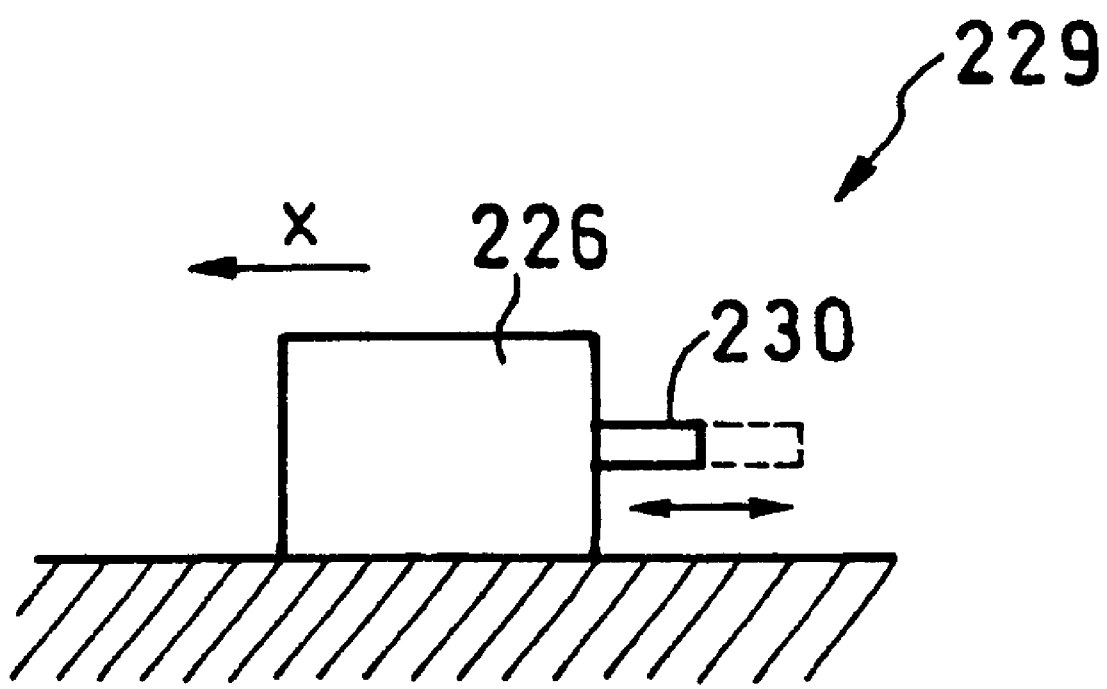

When a given waveform of voltage is applied to such a piezoelectric element 230, then one end of the piezoelectric element 230 is compressed and then resumes the original state as shown in FIG. 19B, whereby an inertia is given to the stage 226, so that the stage 226 moves in X direction, for example.

Figure 20:
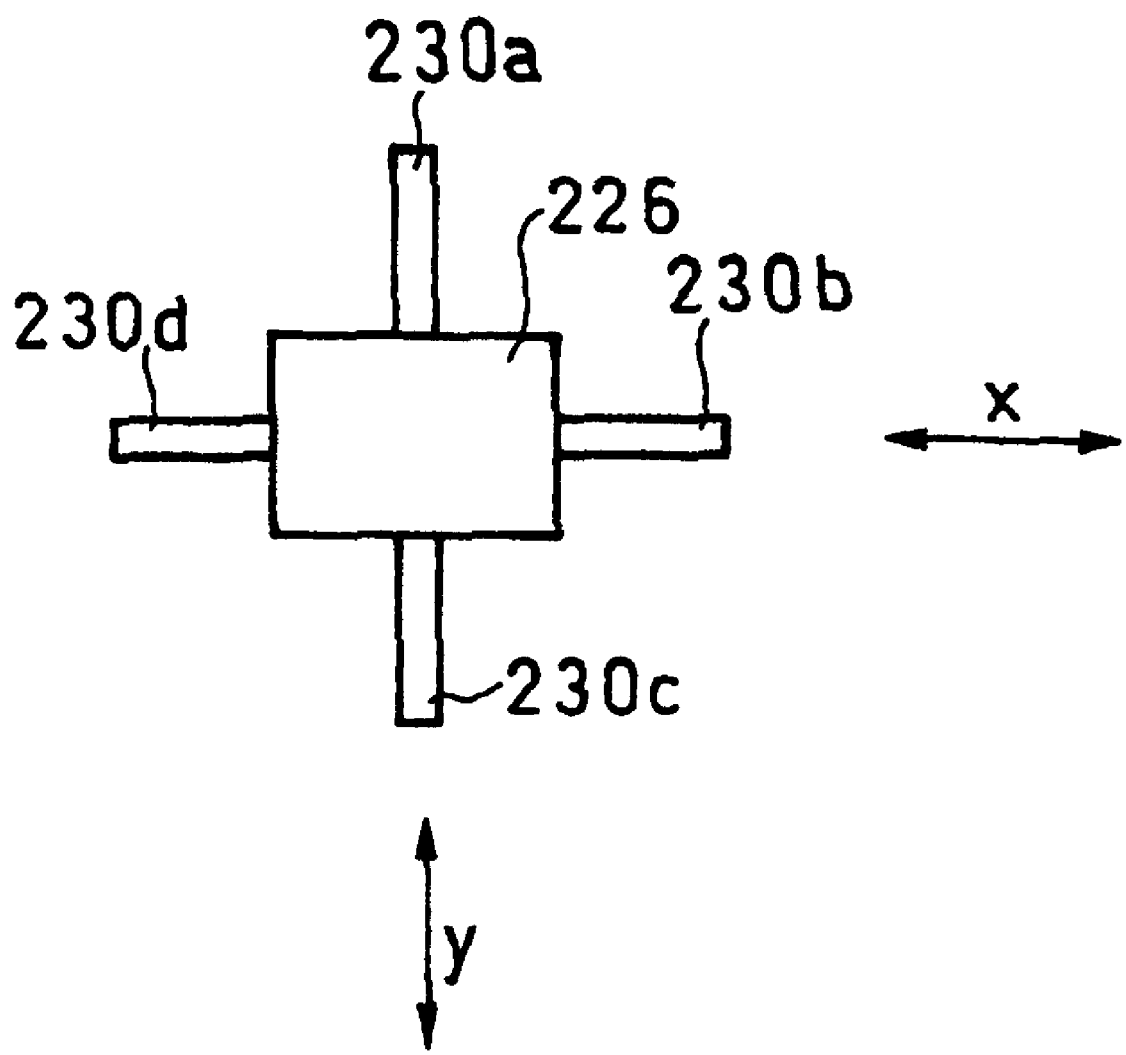
FIG. 20 is an explanatory view of a stage driving mechanism which is preferable in the microscope in accordance with an embodiment of the present invention.

Though the rough moving stage 229 shown in FIGS. 19A, 19B relates to an example in which one side face of the stage 226 is provided with one piezoelectric element 230, so that the stage 226 is moved in X direction, for instance, piezoelectric elements 230a to 230d may be placed instead at four side faces of the stage 226, respectively, as shown in FIG. 20, whereby both of two axes of X and Y can be moved back and forth.

Figure 21:
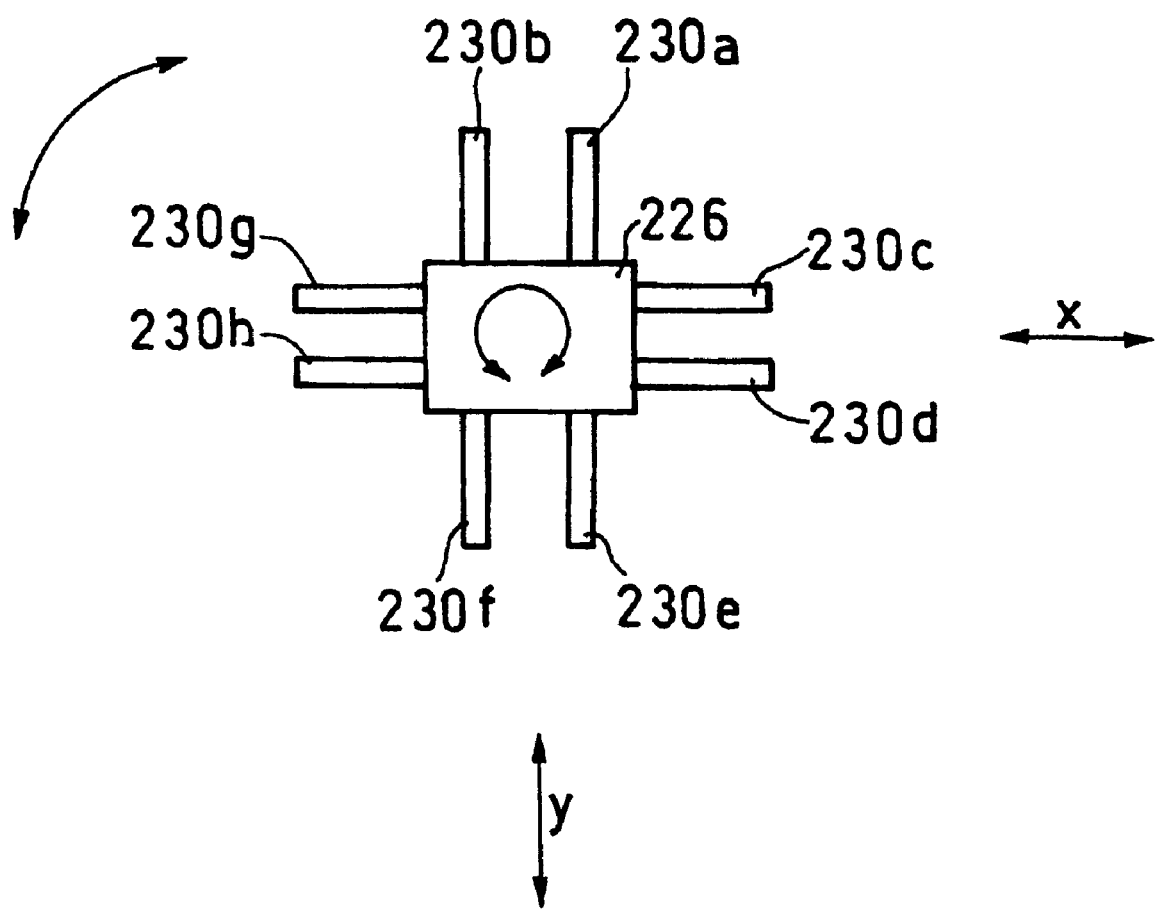
FIG. 21 is an explanatory view of a stage driving mechanism which is preferable in the microscope in accordance with an embodiment of the present invention.

Also, when piezoelectric elements 230a to 230h are placed two by two with a sufficient gap therebetween at four sides of the stage 226 as shown in FIG. 21, not only the biaxial movement of X and Y, but also rotation is possible.

Thus, when any of the minute moving stages shown in FIGS. 19A to 21 are used in the microscope in accordance with this embodiment, all the members such as the piezoelectric element 230 can be accommodated in the side faces of the stage 226.

Therefore, the stage including the rough moving mechanism can be made thinner, whereby the stability against temperature in the vertical direction (Z) can be enhanced.

Further, when the rough moving stage shown in FIG. 21 is employed, piezoelectric elements 230 are placed two by two with a sufficient gap therebetween at four sides of the stage 226, whereby rotational movements which have conventionally been quite difficult can be carried out as well.

Expansion of Stage Dynamic Range

In a probe microscope, one piezoelectric element is usually employed as a driving mechanism for scanning a stage.

If the scanning range of the piezoelectric element is exceeded, then it is necessary to carry out two separate measurement operations independently from each other.

Therefore, in the probe microscope, it is necessary that the scanning range of the piezoelectric element as the driving mechanism for the stage be designed as wide as possible.

However, there is a limit to the realistic scanning range. Also, as the scanning range is made wider, the stage becomes greater, and the stability of measurement tends to become inferior, thereby leaving a room for improvement.

Figure 22:
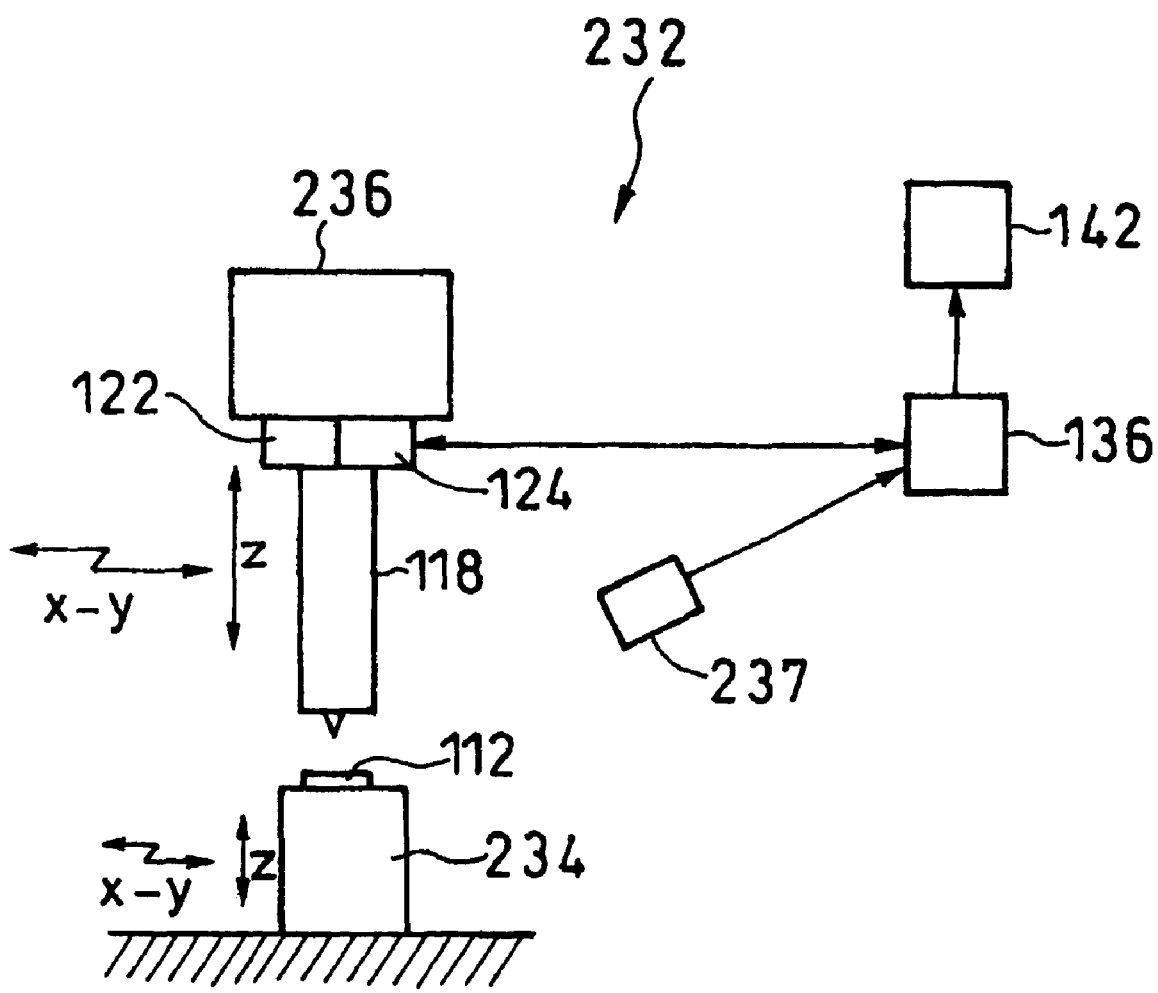
FIG. 22 is an explanatory view of a stage driving mechanism which is preferable in the microscope in accordance with an embodiment of the present invention.

Hence, it is also preferred for the microscope in accordance with this embodiment to use a complex type three-axis stage 232 shown in FIG. 22.

The complex type three-axis stage 232 shown in this drawing includes a minutely movable three-axis stage 234 and a roughly movable three-axis stage 236.

Here, as the driving mechanism, the minutely movable three-axis stage 234 uses a piezoelectric element or the like, for example, and minutely moves in three axis directions of XYZ in FIG. 22, for example, while in a state where the sample 112 is placed thereon.

Also, as the driving mechanism, the roughly movable three-axis stage 236 uses a stepping motor or the like, and is movable in three axis directions of XYZ in FIG. 22, for example, while in a state where the probe 118 is hung, at a speed higher than the minutely movable three-axis stage 234.

If a necessary scanning range is exceeded while scanning the minutely movable three-axis stage 234, then the roughly movable three-axis stage 236 is driven by a necessary amount. Thereafter, the minutely movable three-axis stage 234 is driven again, and data are combined together, whereby an ample amount of movement of the stage can be secured. As a consequence, measurement exceeding the scanning area of the minutely movable three-axis stage 234 such as piezoelectric element can be carried out without the above-mentioned problem. Therefore, the apparatus can be assembled in a compact and highly stable manner.

Z Retraction Mechanism during Measurement

In conventional probe microscopes, there have been a fear of their probe and sample colliding against each other due to temperature drift, shifts in sample position, extreme sample inclinations and irregularities, and the like, thereby damaging the probe or sample, which leaves a room for improvement.

Therefore, in the microscope in accordance with this embodiment, if the personal computer 136 determines that the probe 118 and the sample 112 are located close to each other such that a certain value in the scanning area of Z axis is exceeded as shown in FIG. 22, then the personal computer 136 stops the measurement and drives the roughly movable three-axis stage 236, so as to move the probe 118 and the sample 112 away from each other.

Namely, the probe 118 is moved upward, i.e., in Z-axis direction, in the drawing.

As a result, when such a Z retraction mechanism during measurement is used, the microscope in accordance with this embodiment can prevent the probe or sample from colliding against each other during mapping measurement due to temperature drift, shifts in sample position, extreme sample inclinations and irregularities, and the like, and thereby damaging the probe or sample.

Automatic Approaching Mechanism

In cases of atomic force microscopes and the like, for example, it has been a common practice to change the distance between a probe and a sample from their positions at which they are sufficiently separated from each other, while atomic force signals are successively read out until a change appears therein.

In this case, signals are read out even at a location where the probe and the sample are sufficiently separated from each other, whereby it consumes time unnecessarily, which leaves a room for improvement.

Therefore, in the microscope in accordance with this embodiment, the distance between the sample 112 and the probe 118, such as that shown in FIG. 22, is shortened by use of the three-axis stage 234, such as a piezoelectric element, and the atomic force signal is read out. If no feedback is in effect, then the distance is shortened again by use of the minutely movable three-axis stage 234, so that readout is repeated.

This operation is repeated until feedback is in effect, and the operation is stopped when feedback is in effect.

Also, before the distance is shortened, while the image from a CCD camera 237 or the like for observing the relationship between the probe 118 and the measurement sample 112 from above a side face is viewed with the monitor 142, the distance between the probe 118 and the measurement sample 112 may be manually shortened to about the resolution of the monitor 142.

As a result, the roughly movable three-axis stage 236 is rapidly moved in a part where the probe 118 and the measurement sample 112 are clearly separated from each other, while reading out signals only at minimal necessary portions thereof, whereby the time needed for shortening of the distance can be reduced remarkably.

Near-Field Optical Microscope

Though the above-mentioned configurations relate to an example in which an atomic force microscope using an atomic force as the interaction between the sample and the probe is assumed so as to grasp the form of the sample surface and the like, the probe microscope of the present invention is not restricted thereto. It may be a near-field optical microscope which uses an optical near field as the interaction between the sample and the probe.

Also, the probe microscope in accordance with the present invention is not restricted to those for grasping the surface form of the sample, but can analyze ingredients of the sample at the probe position and the like.

In this case, it is also preferable to use a near-field optical microscope such as one explained in the following, for example.

Figure 23:
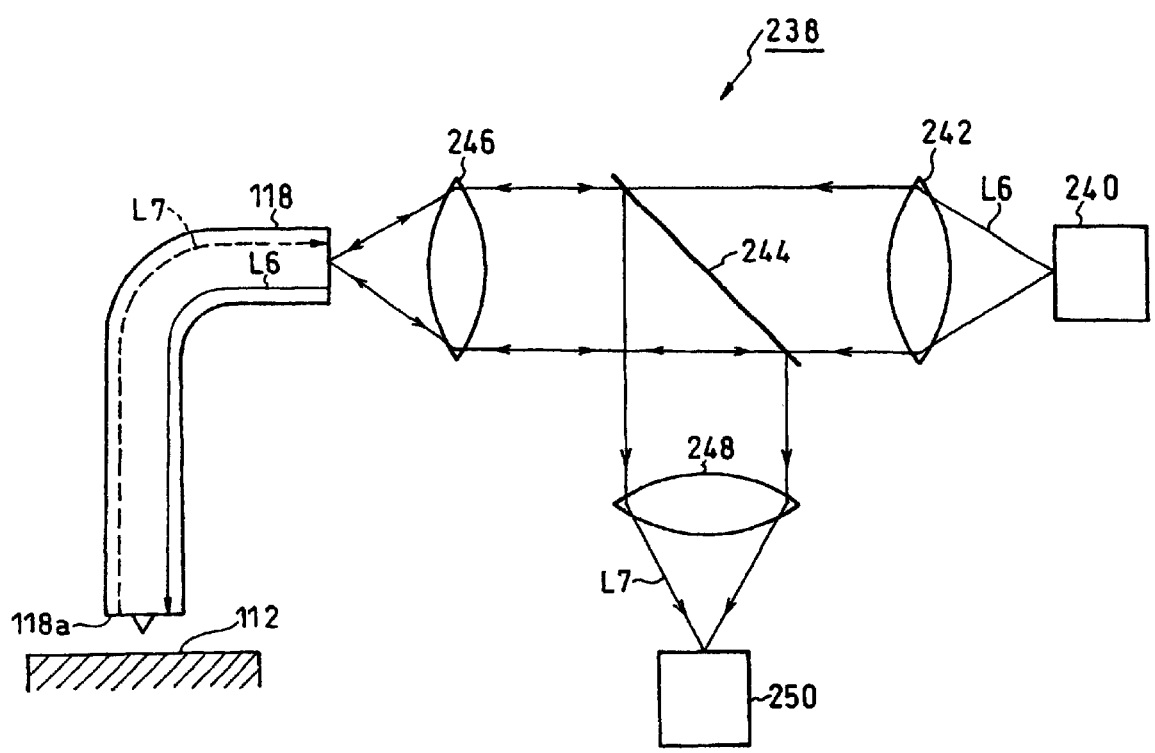
FIG. 23 is an explanatory view of a schematic configuration of a near-field optical microscope in accordance with an embodiment of the present invention.

FIG. 23 shows a schematic configuration of the near-field optical microscope in accordance with an embodiment of the present invention.

In the near-field optical microscope 238 shown in this drawing, laser light L6 from a monochromatic light source 240 is turned into a parallel luminous flux by a lens 242, and the resulting parallel luminous flux is introduced into a probe 118 by way of a beam splitter 244 and a convergent lens 246.

Then, an near-field light is emitted from a tip portion 118a of the probe 118 to a measurement sample 112. Light L7 such as reflected light, scattered light, emission, fluorescence, or Raman light is collected from the tip portion 118a of the same probe 118 and then is introduced into a detector 250 by way of the lens 246, the beam splitter 244, and a lens 248.

Namely, in this embodiment, the laser light L6 as excitation light is emitted from the probe 118, and the light L7 from the sample 112 is collected by the same probe 118.

Here, when a conventional near-field optical apparatus is used for carrying out vibration spectroscopic Raman spectroscopy or infrared spectroscopy, there is an illumination mode in which light is emitted from a probe, and reflected light, scattered light, emission, fluorescence, or Raman light is collected by an external lens or mirror.

Also, there is a collection mode in which the reflected light, scattered light, emission, fluorescence, or Raman light caused by light emitted from the outside is collected by a probe.

In these modes, however, it is necessary to assemble an objective lens for collecting light near a sample stage, or separately assemble an optical system for introducing laser, whereby the apparatus becomes complicated.

In the case of reflection measurement, the probe is shadowed for collecting light or introducing laser, whereby the efficiency of light collection or irradiation becomes inferior. Also, since the sample stage and the probe have to be kept from interfering each other, the magnification of the objective lens cannot be enhanced.

In the case of illumination mode, depending on its photon absorption mechanism, light may be emitted from an area larger than the illuminated portion, whereby the spatial resolution may be deteriorated remarkably.

Therefore, in order to overcome the problems mentioned above, the light L6 from the light source 240 is introduced into a probe 118, and the near-field light is emitted from a tip portion 118a of the probe 118 to a measurement sample 112, and the light L7 from the sample 112 is collected by the same probe 118, as shown in FIG. 23, in the near-field optical microscope 238 in accordance with this embodiment.

Thus, the emission of near-field light and collection of scattered the near-field light can be realized by one probe 118 in the microscope 238 in accordance with this embodiment, whereby the arrangement of the light-collecting system becomes quite easy.

Also, since the probe 118 for collecting light can be placed very close to the sample surface 112, the probe microscope 238 in accordance with this embodiment can collect the scattered near-field light from the sample 112 with such a high efficiency as if a lens having a very high magnification were employed.

The illumination-collection mode carried out by the microscope 238 shown in FIG. 23 can also be used in a near-field Raman spectroscopic apparatus in which the same probe 118 emits excitation light and collects Raman light.

Also, the illumination-collection mode can be used in a near-field infrared spectroscopic apparatus in which the same probe 118 emits and collects infrared light.

The illumination-collection mode can also be used in a near-field Raman spectroscopic apparatus in which the same probe 118 emits excitation light to a sample 112 and collects Raman scattered light of the measurement sample 112 excited by the excitation light.

Also, the illumination-collection mode can be used in a near-field infrared spectroscopic apparatus in which the same probe 118 emits infrared light to the sample 112 and collects the reflected light from the measurement sample 112.

Beam Splitter

When a typical beam splitter with a branching ratio of 1:1 is employed as the beam splitter 244 in the near-field optical microscope 238 shown in FIG. 23, the light L7 from the sample 112 collected by the probe 118 can be taken out by an amount which is only the half of the collected amount, whereby light from the sample has been hindered from being taken out with a high sensitivity.

Though there will be no problems if it is employed in a typical measurement system, the fact that only the half of the collected amount can be taken out may yield a serious problem in the optical system in the near-field optical microscope in accordance with this embodiment in particular, since the near-field light as detection light is light weaker than the typical detection light.

Therefore, the near-field optical microscope 238 in accordance with this embodiment employs one optical component selected from the group consisting of a non-1:1 asymmetrical beam splitter, a low-pass filter, a band rejection filter, a band-pass filter, and a fiber coupler as the beam splitter 244 for carrying out the illumination-collection mode.

Thus, when the non-1:1 asymmetrical beam splitter is employed, the near-field optical microscope 238 in accordance with this embodiment can take out the aimed light from the probe by an efficiency of 50% or higher in contrast to the case where a typical beam splitter which branches incident light by a ratio of 1:1, whereby a satisfactory brightness is obtained.

Sample Surface Observing Mechanism

In a near-field optical probe using an optical fiber or a metal probe used for STM, microscopic observation from directly thereabove has been difficult due to the arrangement thereof. Though observation with a concave mirror or the like may be considered, its arrangement is restricted, whereby it is problematic in that the prospective angle cannot be made greater, and so forth. As a consequence, there are cases where a sufficient resolution cannot be obtained.

Here, even when the resolution is sufficient for a typical measurement system, the prospective angle cannot be made greater in the microscope in accordance with this embodiment, in which a higher resolution is required, whereby higher resolution is hard to obtain, which leaves a room for improvement.

Figure 24:
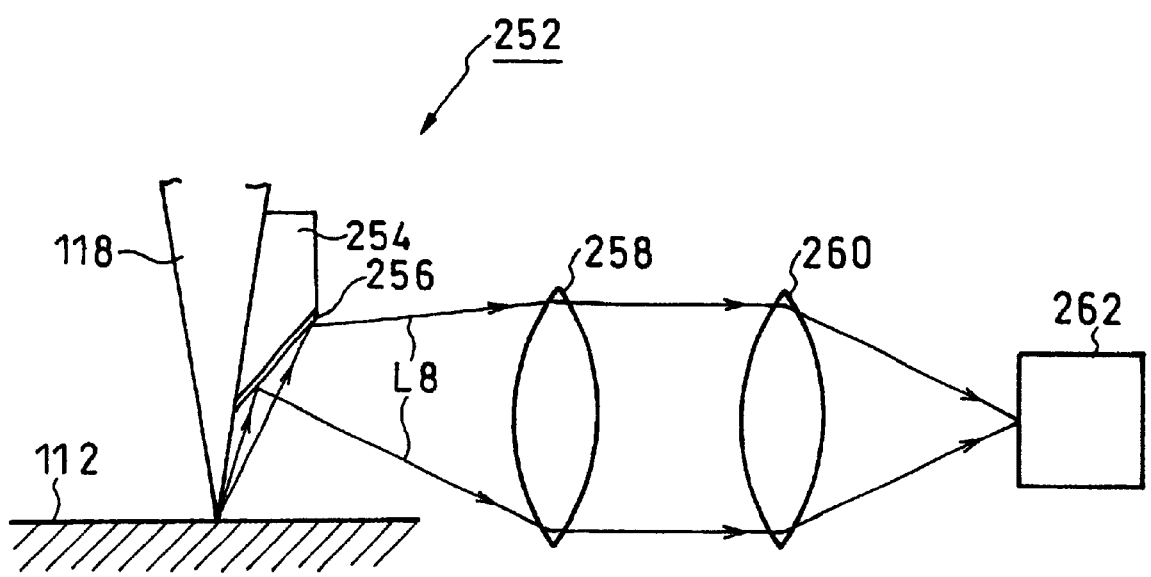
FIG. 24 is an explanatory view of a sample surface observing mechanism which is preferable in the microscope in accordance with an embodiment of the present invention.

Therefore, it is preferred for the microscope in accordance with this embodiment to use a sample surface observing mechanism 252 shown in FIG. 24.

In the sample surface observing mechanism 252 shown in this drawing, a mirror 256 is attached to the root of a holder for the probe 118 or a holder 254 at a lower part of a probe attachment.

As a microscopic image L8 of the measurement sample surface 112 is observed by a CCD 262 or the like by way of the mirror 256 and lenses 258, 260, the measurement sample surface 112 can be observed from directly thereabove.

Thus, when the sample surface observing mechanism 252 shown in this drawing is used, the microscope in accordance with this embodiment enables observation of the sample surface from directly thereabove with an inexpensive configuration, which has conventionally been quite difficult.

Also, when the sample surface observing mechanism 252 shown in this drawing is used in the microscope in accordance with this embodiment, the objective lens of the microscope and the like can be arranged easily, and the prospective angle can be made greater, whereby a satisfactory high resolution can be obtained.

As the mirror 256, one optical component selected from a bored mirror, a slotted mirror, a bored prism, a slotted prism, and a mirror surface into which an attachment is directly mirror-processed can be used.

Also, when microscopic spectroscopy or macroscopic spectroscopy is effected by way of the mirror 256, then it is possible to obtain an atomic force microscope which can carry out macroscopic spectroscopy, microscopic spectroscopy, and near-field probe spectroscopy.

Fiber End Face Observing Mechanism

For example, in a probe microscope such as a near-field optical microscope, introduction of laser light into a probe has been adjusted such that the positional adjustment is carried out while the intensity of laser light emitted from the probe tip portion is being verified or while the laser reflected light from the fiber end face is being observed.

In this case, however, the positional relationship between the fiber core and laser light cannot be recognized and has to be adjusted intuitively, which takes time, thus leaving a room for improvement.

Figure 25:
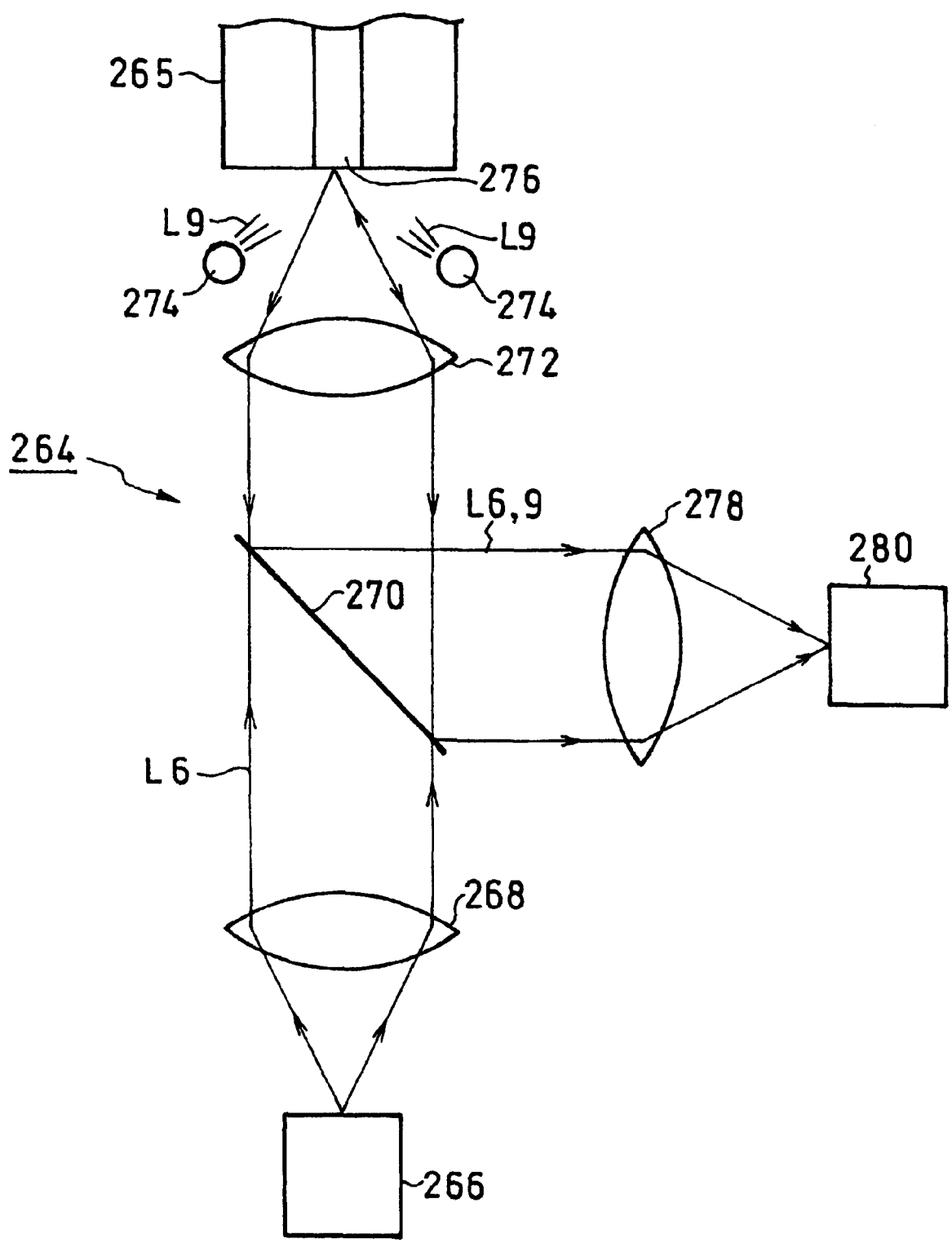
FIG. 25 is an explanatory view of a fiber end face observing mechanism which is preferable in the microscope in accordance with an embodiment of the present invention.

Therefore, it is also preferred for the microscope in accordance with this embodiment to use a fiber end face observing mechanism 264 shown in FIG. 25.

The fiber end face observing mechanism 264 shown in this drawing is intended to be used for a near-field optical microscope in which a probe 118 emits near-field light to a measurement sample whereas this probe, a condenser lens, or the like collects scattered near-field light from the measurement sample, for example.

By way of a lens 268, a beam splitter 270, and a lens 272, the optical fiber end face 265, on the side opposite from the probe 118, of an optical fiber linked to the probe 118 is irradiated with laser light L6 from a monochromatic light source 266 to be introduced into the probe 118.

Here, the fiber end face observing mechanism 264 directly irradiates the optical fiber end face 265 with white light L9 from a white light source 274.

Thus, in the microscope in accordance with this embodiment, while the positional relationship between a fiber core 276 and laser light L6 is directly observed through the lens 272, beam splitter 270, lens 278, and CCD 280 upon irradiation of light L9 from a white light source 274, the positions of fiber core 276 and laser light L6 can be adjusted.

As a consequence, when the fiber end face observing mechanism 264 shown in this drawing is used, the direction to be adjusted can be verified each time, whereby the adjustment can be carried out faster and more easily as compared with the conventional cases where the adjustment is made intuitively.

Position Adjusting Mechanism

For positioning a component such as an optical device or a stage in three axis i.e., XYZ directions, a mechanism in which respective position-adjusting axes project in three axis directions orthogonal to each other is typically used.

When it is assembled so as to be accessible for adjustment from the three axis directions orthogonal to each other, then its configuration becomes complicated. Also, the adjustment has to be made in three directions, whereby operations become troublesome.

Therefore, even a complicated configuration or operation which is not problematic to be used in a relatively simple measurement system is needed to be simplified in the probe microscope in accordance with this embodiment, which necessitates various kinds of operations due to various functions provided therein, whereby a room for improvement is left.

Figure 26:
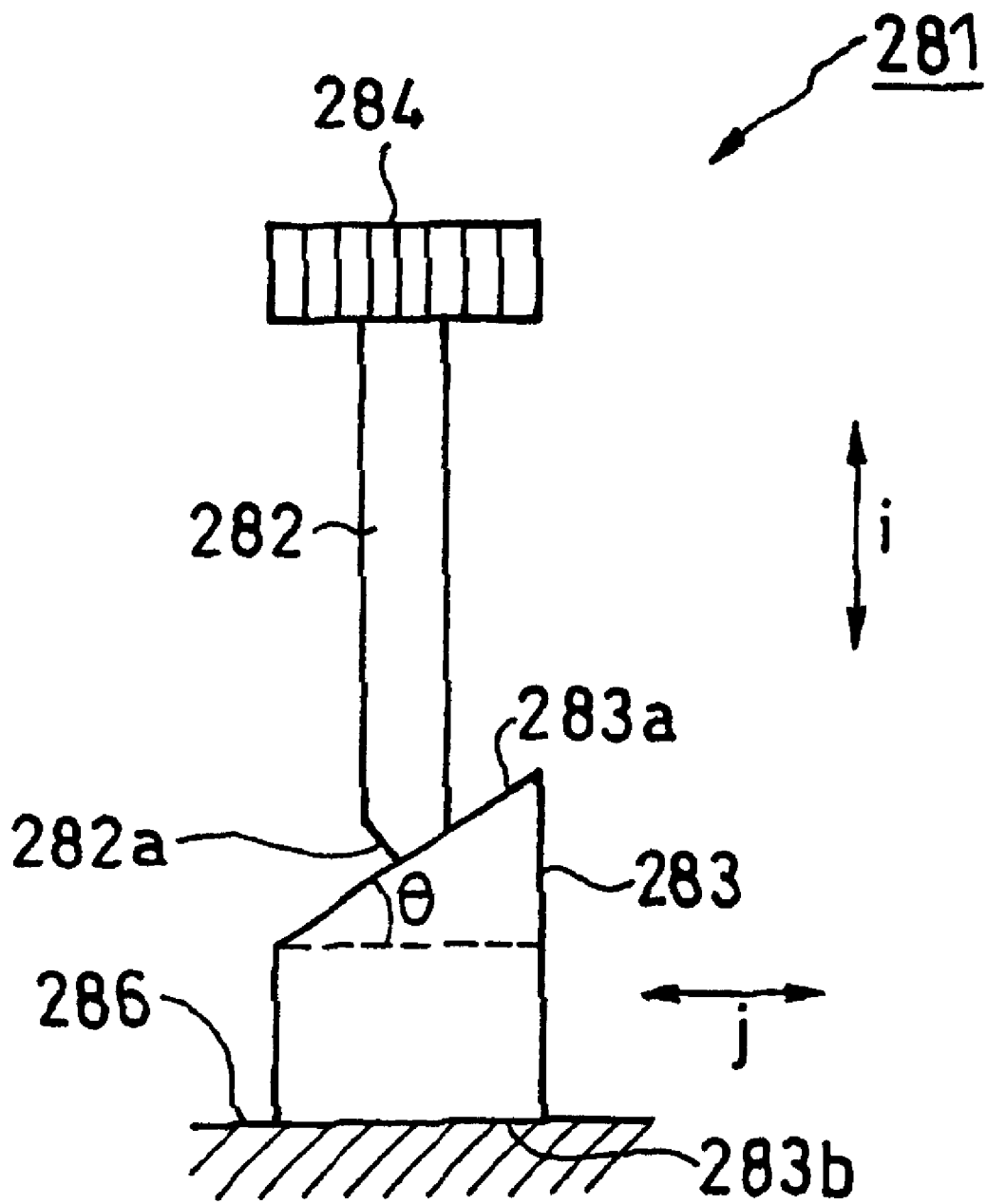
FIG. 26 is an explanatory view of a position adjusting mechanism which is preferable in the microscope in accordance with an embodiment of the present invention.

Hence, it is also preferred for the microscope in accordance with the present invention to use a position adjusting mechanism 281 shown in FIG. 26.

The position adjusting mechanism shown in this drawing includes a position adjusting screw 282 and a triangular block 283.

Here, the position adjusting screw 282 is provided with a handle 284 at an end portion thereof on its operation side, and is movable in the directions of i in the drawing as the handle 284 is rotated.

In the triangular block 283, its slope 283a on the handle side abuts against a tip portion 282a of the position adjusting screw 282, whereas its opposite face 283b is secured to a component 286 such as a stage.

The moving directions of the triangular block 283 are restricted by a slider (not depicted) or the like such that it is movable only in the directions of i in the drawing along the inclination of the slope 283a when the position adjusting screw 282 moves in the directions of i in the drawing.

For adjusting the three axes of XYZ, three sets of position adjusting mechanisms 281 each shown in this drawing are provided.

Namely, in view of the orientation of the slope of the X-axis triangular block and the movable directions of the X-axis triangular block regulated by the X-axis slider or the like, a certain surface of the component 286 such as a stage is provided with the position adjusting mechanism 281 shown in this drawing for position adjustment in the X-axis direction, such that the X-axis triangular block is movable only in X direction.

Also, in view of the orientation of the slope of the Z-axis triangular block and the movable directions of the Z-axis triangular block regulated by the Z-axis slider or the like, the same surface of the component 286 such as a stage provided with the X-axis position adjusting mechanism is provided with the position adjusting mechanism 281 for position adjustment in the Z-axis direction, such that the Z-axis triangular block is movable only in Z direction.

Further, in view of the orientation of the slope of the Y-axis triangular block and the movable directions of the Y-axis triangular block regulated by the Y-axis slider or the like, the same surface of the component 286 such as a stage provided with the X-axis position adjusting mechanism and Z-axis position adjusting mechanism is provided with the position adjusting mechanism 281 for position adjustment in the Y-axis direction, such that the Y-axis triangular block is movable only in Y direction.

Thus, the respective directions of the heads of position adjusting screws are taken into consideration so as to enable the positional adjustment of three axes of XYZ from the same direction.

Hence, when three position adjusting mechanisms 281 each shown in FIG. 26 are used for positional adjustment of the individual axis directions in the microscope in accordance with this embodiment, the user can access it from the same direction, whereby the configuration and operations are simplified.

If the angle of inclination θ of the slope 283a in the triangular block 283 is determined appropriately, then the rotation of the handle 284 of the position adjusting screw 282 can be enlarged or reduced.

Namely, if the angle of inclination θ of the slope 283a in the triangular block 283 is made greater, then the rotation of the handle 284 of the position adjusting screw 282 can be enlarged.

On the other hand, if the angle of inclination θ of the slope 283a in the triangular block 283 is made smaller, then the rotation of the handle 284 of the position adjusting screw 282 can be reduced, whereby the component 286 provided with the position adjusting mechanism 281 can be positioned appropriately and easily.

Light Reflecting and Collecting System

For example, in a measurement system which collects light from a measurement sample, and detects or spectrally decomposes the light, a single objective lens has been used for collecting the light.

In this case, the prospective angle capable of collecting light is limited, and the quantity of light becomes insufficient in the case of high-sensitivity measurement.

While a plurality of lenses may be used, no method has been known for effectively combining their light beams, and the sensitivity cannot be raised efficiently, whereby they have not yet been employed as means for overcoming the lack of light quantity.

A lack of light quantity which is unproblematic in typical measurement systems may generate a severe decrease in detection accuracy in a probe microscope such as atomic force microscope or near-field optical microscope for which measurement with a higher accuracy is required for minuter samples as compared with the typical measurement systems, whereby there is an urgent demand for developing a technology which can overcome this problem.

Figure 27:
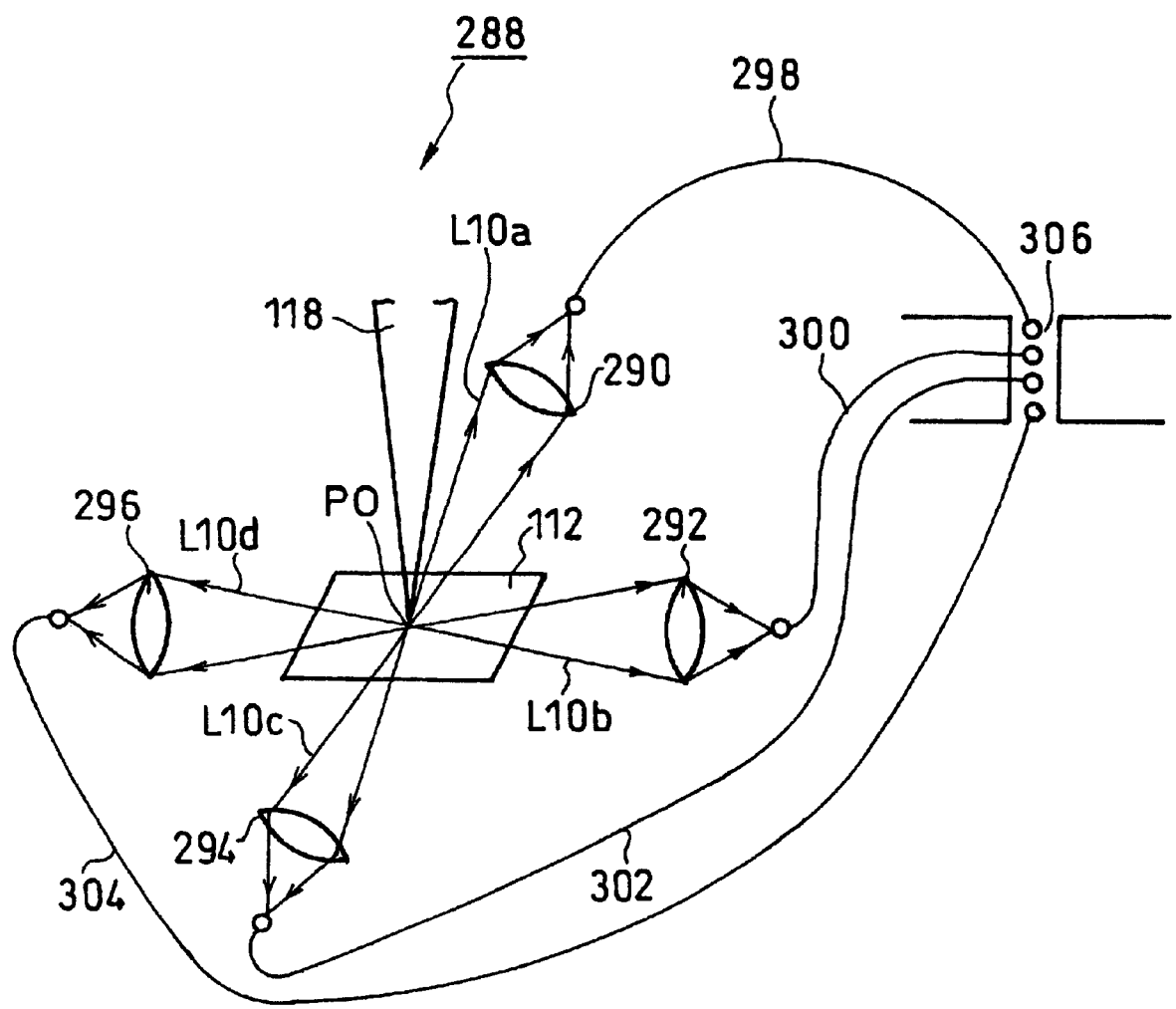
FIG. 27 is an explanatory view of a light reflecting and collecting system which is preferable in the microscope in accordance with an embodiment of the present invention.

Therefore, it is also preferred for the microscope in accordance with this embodiment to use a light reflecting and collecting system 288 shown in FIG. 27.

In the light reflecting and collecting system 288 shown in this drawing, a plurality of objective lenses 290, 292, 294, 296 are placed about the measurement sample 112.

These objective lenses 290 to 296 collect light beams L10a to L10d, such as emission, scattered light, and transmitted light from a measurement point P0 of the measurement sample 112, including information about ingredients at the measurement point P0 and the like.

The light beams L10a to L10d from the individual objective lenses 290, 292, 294, 296 are made incident on entrance slits 306 of a spectroscope or detector in a vertical row by means of the respective optical couplers 298 to 304, so as to be combined together.

Thus, when the light reflecting and collecting system 288 shown in this drawing is used in the microscope in accordance with this embodiment, the light utilization efficiency of the spectrometer or detector is independent of the vertical positions of entrance slits 306, and the amount of light collection can be enhanced when the different light beams L10a to L10d are introduced as being divided vertically.

Therefore, sensitivity can be enhanced in proportion to the quantity of collected light beams L10a to L10d, which has conventionally been quite difficult.

As a consequence, the light reflecting and collecting system 288 shown in this drawing can favorably be used in a probe microscope such as atomic force microscope or near-field optical microscope which necessitates a larger quantity of light than typical measurement systems do.

Optical Shutter

As the driving member for an optical shutter used in a spectroscope or the like, an electromagnet, a motor, a stepping motor, or the like, for example, is used in general.

When the typical driving member mentioned above is employed, however, vibrations occur more or less upon opening and closing the shutter. Vibrations which are not unproblematic in normal measurement systems, such as those upon opening and closing of the optical shutter, may adversely affect measurement in a measurement system which detects minute vibrations of a probe such as atomic force microscope or near-field optical microscope, which is susceptible to vibrations.

Figure 28A:
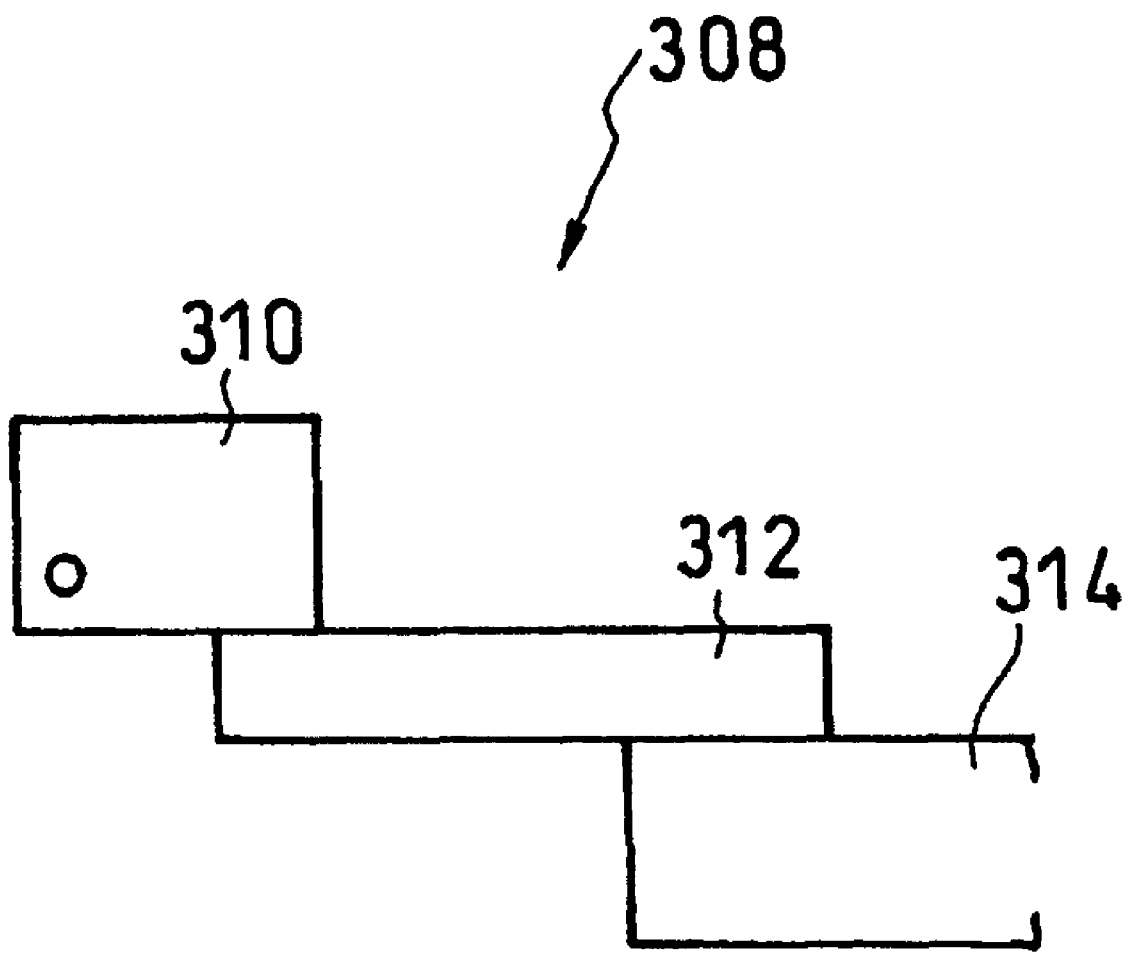
FIGS. 28A and 28B are explanatory views of an optical shutter which is preferable in the microscope in accordance with an embodiment of the present invention.
Figure 28B:
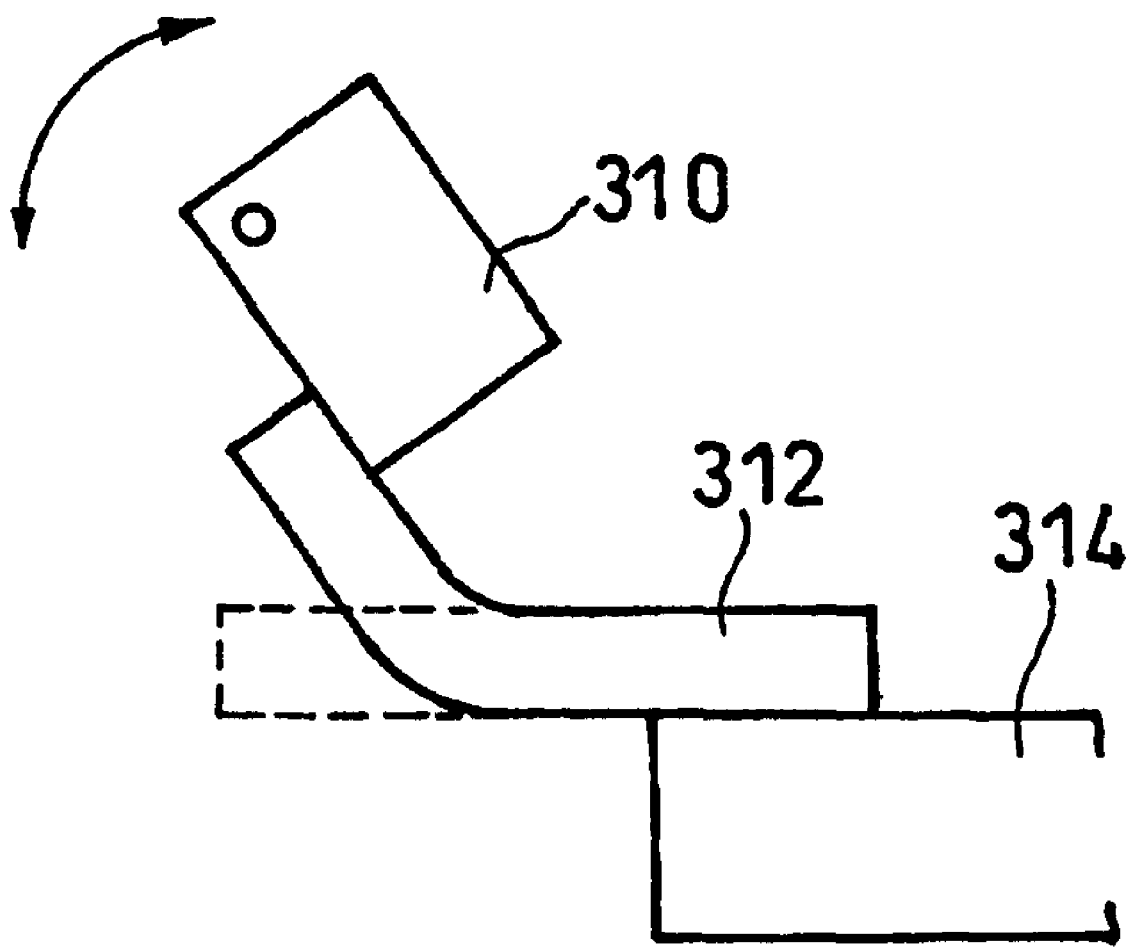

Therefore, it is preferred for the microscope in accordance with this embodiment to use an optical shutter 308 shown in FIGS. 28A and 28B, for example.

In FIG. 28A, a vibration-free bimorph 312 is used as the driving mechanism for a shutter body 310, and one side thereof is secured to a base 314, whereas the other side is secured to the shutter body 310.

When a voltage is applied to the bimorph 312, its tip portion on the shutter body 310 side is bent clockwise as shown in FIG. 28B, for example, or resumes its original state. Therefore, the shutter body 310 is also driven clockwise or counterclockwise in the drawing.

Thus, when the optical shutter 308 shown in these drawings is used as an optical shutter for the spectroscope or the like in this embodiment, the bimorph 312 itself generates no vibrations, and the position of the shutter body 310 can accurately be determined according to the voltage applied to the bimorph 312, whereby there would be no vibrations caused by butting for positioning the optical shutter body 310.

Hence, the optical shutter 308 shown in these drawings can also favorably be used as an optical shutter for a spectroscope, detector, or the like in an atomic force microscope, a near-field optical microscope, or the like which is more susceptible to vibrations, in particular, than other measurement systems.

We claim:

1. A probe microscope for causing a measurement sample surface and a tip portion of a probe to approach each other, detecting an interaction between said measurement sample surface and the tip portion of said probe, and obtaining surface information of said measurement sample surface from said interaction;

said probe being a flexible needle-like probe;

said probe microscope comprising:

vibrating means rotating said probe while flexing the tip portion so as to draw a circle having a size corresponding to an increase and decrease in the interaction between said measurement sample surface and the tip portion of said probe; and detecting means for detecting the increase and decrease in the size of the circle drawn by the tip portion of said probe due to the interaction between said measurement sample surface and the tip portion of said probe and obtaining, from the increase and decrease in the size of the circle, information about the distance between said measurement sample surface and the tip portion of said probe.

2. A probe microscope according to claim 1, wherein said vibrating means also vibrates said probe in a direction in which said measurement sample surface and the tip portion of said probe approach each other or move away from each other; and wherein said detecting means detects the increase and decrease in the size of the circle drawn by the tip portion of said probe due to the interaction between said measurement sample surface and the tip portion of said probe and obtains, from the increase and decrease in the size of the circle, information about the distance between said measurement sample surface and the tip portion of said probe.

3. A probe microscope according to claim 1, wherein said vibrating means includes one driving member selected from the group consisting of a piezoelectric element and a motor which rotates said probe while flexing the tip portion such that at least the tip portion of said probe draws a circle having a size corresponding to an increase and decrease in the interaction between said measurement sample surface and the tip portion of said probe.

4. A probe microscope according to claim 1, wherein said detecting means comprises:

a probe irradiating portion irradiates said probe with probe light;

a photodetector portion for detecting reflected or transmitted probe light from said probe; and a signal processing portion for obtaining, from the reflected or transmitted probe light obtained by said photodetector portion, information about the increase and decrease in the size of the circle drawn by the tip portion of said probe.

5. A probe microscope according to claim 1, wherein said detecting means is one member selected from the group consisting of a quartz vibrator and a piezoelectric element which obtains information about the increase and decrease in the size of the circle drawn by the tip portion of said probe.

6. A probe microscope according to claim 1, comprising:

a divided type piezoelectric element having a vibrating electrode pair placed face to face as said vibrating means and a detecting electrode pair placed face to face as said detecting means, which are arranged alternately over substantially the whole periphery on the opposite side of said probe from the tip portion; and control means for causing said vibrating electrode pair to vibrate said probe and said detecting electrode pair to detect the increase and decrease in the size of the circle simultaneously or alternately in a time series.

7. A probe microscope according to claim 1, wherein the interaction between said measurement sample surface and the tip portion of said probe is a dynamic interaction.

8. A probe microscope according to claim 1, wherein the interaction between said measurement sample surface and the tip portion of said probe is an optical near field.

9. A probe microscope according to claim 1, comprising;

scanning means scans said measurement sample surface such that the distance between said measurement sample surface and the tip portion of said probe obtained by said detecting means is kept constant; and visualizing means for visualizing control information of said scanning means so as to visualize information about irregularities in said measurement sample surface.

10. A probe microscope according to claim 1, wherein a radius of the circle is in a plane which is parallel to the sample surface.

11. A probe microscope according to claim 1, wherein the circle lies in a plane which is parallel to the sample surface.

12. A probe microscope according to claim 9, wherein the circle lies in a plane which is parallel to the sample surface.

* * * * *

UNITED STATES PATENT AND TRADEMARK OFFICE
CERTIFICATE OF CORRECTION

PATENT NO.    : 6,470,738 B2
DATED         : October 29, 2002
INVENTOR(S)   : Yoshihito Narita et al.

It is certified that error appears in the above-identified patent and that said Letters Patent is hereby corrected as shown below:

<u>Title page,</u>
Item [73], Assignees, for the second assignee, before "Technology Corporation" insert -- Japan Science and --.

Signed and Sealed this

Eighteenth Day of March, 2003

JAMES E. ROGAN
*Director of the United States Patent and Trademark Office*